(12) United States Patent
Hiraki et al.

(10) Patent No.: US 10,906,065 B2
(45) Date of Patent: *Feb. 2, 2021

(54) LAMINATE, SURFACE-PROTECTED ARTICLES, AND MANUFACTURING METHOD OF THE LAMINATE

(71) Applicants: JNC CORPORATION, Tokyo (JP); SUMIRON CO., LTD., Osaka (JP)

(72) Inventors: Soichiro Hiraki, Chiba (JP); Koji Ohguma, Chiba (JP); Mikio Yamahiro, Chiba (JP); Taro Magatani, Mie (JP); Shigetaka Ikemoto, Mie (JP)

(73) Assignees: JNC CORPORATION, Tokyo (JP); SUMIRON CO., LTD., Osaka (JP)

( * ) Notice: Subject to any disclaimer, the term of this patent is extended or adjusted under 35 U.S.C. 154(b) by 549 days.

This patent is subject to a terminal disclaimer.

(21) Appl. No.: 15/326,037

(22) PCT Filed: Jul. 14, 2015

(86) PCT No.: PCT/JP2015/070168
§ 371 (c)(1),
(2) Date: Mar. 13, 2017

(87) PCT Pub. No.: WO2016/010041
PCT Pub. Date: Jan. 21, 2016

(65) Prior Publication Data
US 2017/0226385 A1    Aug. 10, 2017

(30) Foreign Application Priority Data
Jul. 15, 2014 (JP) .................. 2014-145465

(51) Int. Cl.
| | | |
|---|---|---|
| B32B 27/00 | (2006.01) |
| B05D 1/02 | (2006.01) |
| C09J 133/04 | (2006.01) |
| C09J 7/20 | (2018.01) |
| C09J 151/08 | (2006.01) |
| C08F 290/06 | (2006.01) |
| C09D 151/08 | (2006.01) |
| C09D 175/16 | (2006.01) |
| C09J 7/25 | (2018.01) |
| B05D 1/18 | (2006.01) |
| B05D 1/30 | (2006.01) |
| C09J 133/08 | (2006.01) |

(52) U.S. Cl.
CPC ............... *B05D 1/02* (2013.01); *B05D 1/18* (2013.01); *B05D 1/305* (2013.01); *B32B 27/00* (2013.01); *C08F 290/067* (2013.01); *C08F 290/068* (2013.01); *C09D 151/08* (2013.01); *C09D 151/085* (2013.01); *C09D 175/16* (2013.01); *C09J 7/20* (2018.01); *C09J 7/25* (2018.01); *C09J 133/04* (2013.01); *C09J 133/08* (2013.01); *C09J 151/08* (2013.01); *C09J 151/085* (2013.01); *C09J 2433/00* (2013.01); *C09J 2475/006* (2013.01); *Y10T 428/14* (2015.01); *Y10T 428/1476* (2015.01); *Y10T 428/28* (2015.01); *Y10T 428/2848* (2015.01)

(58) Field of Classification Search
None
See application file for complete search history.

(56) References Cited

U.S. PATENT DOCUMENTS

2007/0135602 A1* 6/2007 Yamahiro .............. C08F 214/18
526/242
2018/0258323 A1* 9/2018 Hiraki ..................... B32B 27/00

FOREIGN PATENT DOCUMENTS

| CN | 2630060 | 8/2004 |
| CN | 103153617 | 6/2013 |
| JP | 2007216615 A * | 8/2007 |
| JP | 2008-274011 | 11/2008 |
| JP | 2008-539107 | 11/2008 |
| JP | 2008274011 A * | 11/2008 |
| JP | 5426159 | 2/2014 |
| WO | 2008102670 | 8/2008 |

OTHER PUBLICATIONS

Ito, Yubn et al., "Laminate With Releasability and Manufacturing Method of the Same", machine translation of JP 2007-216615 A, published Aug. 30, 2007. (Year: 2007).*
Nishio, Hiroaki et al., "Surface Protection Film", machine translation of JP 2008-274011A, published Nov. 13, 2008. (Year: 2008).*
Arvindaraj G. Kannan et al., "Designing Superhydrophobic Surfaces Using Fluorosilsequioxane-Urethane Hybrid and Porous Silicon Gradients", proceedings of SPIE, 2008. (Year: 2008).*
Joseph M. Marby et al., "Fluorinated Polyhedral Organic Silsesquioxanes (F-POSS)", Angewandte Chemie, vol. 47, pp. 4137-4140, 2008. (Year: 2008).*

(Continued)

*Primary Examiner* — Anish P Desai
(74) *Attorney, Agent, or Firm* — JCIPRNET

(57) ABSTRACT

The invention of the present application is a laminate in which thermoplastic polyurethane is used, excellent antifouling and adhesion properties are obtained, and glue residue is minimized. The laminate is provided with a substrate film formed from thermoplastic polyurethane, and an adhesive layer formed on one surface side of the substrate film. The substrate film has a surface layer on the opposite side of the first surface, a mixture of the thermoplastic polyurethane and a curable resin composition being present in the surface layer. The content ratio of the curable resin composition is configured so as to gradually decrease from the surface of the surface layer towards the interior of the substrate film. The curable resin composition contains at least one fluorine compound selected from the group consisting of fluorosilsesquioxane and fluorosilsesquioxane polymers, and a curable resin. The adhesive layer has a surface roughness of 350-750 nm.

15 Claims, 3 Drawing Sheets

(56) References Cited

OTHER PUBLICATIONS

Takefumi Ito et al., "Laminate Having Releasability and Method for Producing the Same", English translation of JP 2007-216615A, Aug. 30, 2007. (Year: 2007).*

Hiroaki Nishio et al., "Surface Protective Film", English translation of JP 2008-274011A, Nov. 13, 2008. (Year: 2008).*

"Office Action of China Counterpart Application," with partial English translation thereof, dated Nov. 23, 2017, p. 1-p. 15, in which the listed references were cited.

"International Search Report (Form PCT/ISA/210) of PCT/JP2015/070168", with English translation thereof, dated Oct. 13, 2015, pp. 1-4.

\* cited by examiner

LAMINATE, SURFACE-PROTECTED ARTICLES, AND MANUFACTURING METHOD OF THE LAMINATE

CROSS-REFERENCE TO RELATED APPLICATION

This application is a 371 application of the international PCT application serial no. PCT/JP2015/070168, filed on Jul. 14, 2015, which claims the priority benefit of Japan application no. 2014-145465, filed on Jul. 15, 2014. The entirety of each of the abovementioned patent applications is hereby incorporated by reference herein and made a part of this specification.

FIELD OF THE INVENTION

The present invention generally relates to a laminate, and particularly to a laminate in which thermoplastic polyurethane is used.

DESCRIPTION OF RELATED ART

Thermoplastic polyurethane (TPU) having high impact strength is always used as a substrate for protection films and others. Particularly in Europe and the United States, films for example paint protection film (PPF) that protect the automotive vehicle body from splashing stone or scratches are widespread. Examples include Scotchgard paint protection film from 3M Company.

As a laminate using thermoplastic polyurethane, Patent Document 1 discloses a multilayer film for surface protection, particularly a film used, for example, for protecting the surface (e.g. coating) of transportation tools (e.g. automotive vehicles, airplanes, and ships and boats), and specifically a multilayer protection film that is processed with a pressure sensitive adhesive on the rear surface and has a polyurethane layer on the uppermost portion of the thermoplastic polyurethane layer (Paragraph 0001).

These protection films (multilayer protection films) are required to have various properties. For example, the protection films are required to impart an antifouling property to the surface of the painted plate of automotive vehicles and to have increased property of adhesion to the painted plate, thereby improving the heat and weather resistance; and also required to have no glue remaining in the adhesion site when the protection films are peeled off from the painted plate.

PRIOR ART LITERATURES

Patent Document

[Patent Document 1] Japanese Patent No. 5426159

SUMMARY OF THE INVENTION

Objective of the Invention

Accordingly, the present invention is directed to a laminate using thermoplastic polyurethane and useful as a protection film, in which excellent antifouling and adhesion properties are obtained, and glue residue is minimized.

Solution

The present inventors have made intensive studies for achieving the above-mentioned objective. As a result, it is found that if a laminate below is used as a protection film, then the protection film can be one having excellent performances not found for those in the prior art, whereby the present invention is accomplished. The laminate is obtained by combining a surface layer containing a fluorine compound formed by penetrating the thermoplastic polyurethane and an adhesive layer that improves the adhesion property and has no glue residue upon peeling.

For example, as shown in FIG. 1, a laminate provided in a first aspect of the present invention is a laminate 10 provided with a substrate film 11 formed from thermoplastic polyurethane, and an adhesive layer 13 formed on a first surface side of the substrate film 11. The substrate film 11 has a surface layer 12 on the opposite side of the first surface, a mixture of the thermoplastic polyurethane and a curable resin composition being present in the surface layer 12. The content ratio of the curable resin composition is configured so as to gradually decrease from the surface s1 of the surface layer 12 towards the interior of the substrate film 11. The curable resin composition contains at least one fluorine compound ss selected from the group consisting of fluorosilsesquioxane and fluorosilsesquioxane polymers, and a curable resin. The adhesive layer 13 has a surface roughness of 350-750 nm.

Moreover, the so called "on the surface side" herein refers to lamination in a contact manner or lamination with other layers intervened. The so called "on the surface" refers to lamination in a contact manner.

If constructed as such, the fluorine compound is aggregated at the surface of the surface layer, whereby the surface of the substrate film is modified without compromising the flexibility of the thermoplastic polyurethane, and a laminate with excellent antifouling property is obtained. Further, by having an adhesive layer with a surface roughness of 350-750 nm, the laminate is enabled to have excellent adhesion property, and minimized glue residue when the laminate is peeled off.

Moreover, the adhesive layer also serves as a buffer layer between the laminate and the surface of an adhered article, such that the defect-free presence of the adhesive layer can alleviate the influence of impact to the adhered article in the application field of the laminate as described above.

A laminate provided in a second aspect of the present invention is as shown by the laminate 10 provided in the first aspect of the present invention, where the fluorine compound ss has a cage structure, the curable resin contains at least a compound having a (meth)acryloyl group, and the adhesive layer 13 is formed with at least a resin selected from the group consisting of acrylic resin, urethane resin, rubber resin, and silicone resin.

If constructed as such, the fluorine compound trends to aggregate at the interface between the air and the solid, and thus a laminate having increased aggregation rate at the interface between the air and the solid is obtained. Further, the compound having a (meth)acryloyl group contained in the curable resin penetrates into the thermoplastic polyurethane, so a surface layer that is integrated with the substrate film is formed without compromising the flexibility of the thermoplastic polyurethane. Therefore, although a two-layer laminate generally has a long elongation rate and is prone to cracking, the elongation rate of the laminate of this application is high, and no cracks are produced even when the elongation rate is set to, for example, 100%.

A laminate provided in a third aspect of the present invention is as shown by the laminate 10 provided in the first or second aspect of the present invention, where the fluorosilsesquioxane polymer is an addition polymer of fluororosilsesquioxane having at least one addition polymerizable functional group, or an addition copolymer of fluorosilsesquioxane having one addition polymerizable functional group with other addition polymerizable monomers.

If constructed as such, a laminate using an addition polymer suitable for use as a fluorosilsesquioxane polymer is obtained.

A laminate provided in a fourth aspect of the present invention is as shown by the laminate 10 provided in any one of the first to third aspects of the present invention, which has a peelable film 14 provided on a surface of the adhesive layer 13 opposing the substrate film 11, where the surface of the peelable film 14 facing toward the adhesive layer 13 has a surface roughness of 350-800 nm.

If constructed as such, when the laminate is manufactured, the surface roughness of the adhesive layer 13 can be set to 350-750 nm by the peelable film 14 having a surface roughness of 350-800 nm. Furthermore, the adhesive surface of the adhesive layer 13 can be protected by the peelable film 14 after the laminate is manufactured.

A laminate provided in a fifth aspect of the present invention is as shown by the laminate 10 provided in the fourth aspect of the present invention, where the adhesive layer 13 retains the irregularities exhibiting the surface roughness in a period from 10 to 120 min after the peelable film 14 is peeled off.

If constructed as such, when the laminate is attached to an article to be adhered, adjacent non-adhered depressed portions of the adhesive layer are successively used while the bubbles are removed rapidly, such that the adhesive surface removed of bubbles is gradually sequentially adhered to and integrated with the article to be adhered. After attachment, the irregularities trend to disappear under the action of the pressure applied, and thus the laminate is evenly attached following the contour of the adhered article.

A laminate provided in a sixth aspect of the present invention is as shown by the laminate 10 provided in the fourth or fifth aspect of the present invention, where the surface of the peelable film 14 facing toward the adhesive layer 13 is coated with at least a peeling agent selected from fluorine resins, silicone resins, and long-chain carbamate.

If constructed as such, the peelable film can be easily peeled off from the adhesive layer.

A surface protected article provided in a seventh aspect of the present invention has a laminate shown in any one of the first to third aspects of the present invention; and an article where the laminate is attached to a surface thereof by the adhesive layer 13, and the irregularities of the adhesive layer 13 exhibiting the surface roughness has disappeared.

If constructed as such, the painting on the surface of an article can be protected by the laminate that is evenly attached following the contour of the article after the irregularities are disappeared. Moreover, the surface can be protected from damages by the thermoplastic polyurethane having high impact strength. In addition, the antifouling property can be improved by the surface layer. Furthermore, the adhesive layer has excellent adhesion property, and good heat and weatherability, and has no glue residue after the laminate is peeled off.

A method for manufacturing a laminate provided in an eighth aspect of the present invention includes the steps of providing a substrate film 11 formed from thermoplastic polyurethane; forming an adhesive layer 13 on a first surface side of the substrate film 11, where a surface of the adhesive layer 13 opposing the substrate film 11 has a roughness of 350-750 nm; coating a curable resin composition on a second surface of the substrate film 11 opposing the first surface, to penetrate the curable resin composition into the substrate film 11; and irradiating the curable resin composition with UV rays, where the curable resin composition contains at least one fluorine compound selected from the group consisting of fluorosilsesquioxane and fluorosilsesquioxane polymers, and a curable resin.

If constructed as such, an adhesive layer with excellent adhesion property can be formed. Furthermore, a surface layer where a mixture of a part of the substrate film and a curable resin composition is present is formed without compromising the flexibility of the thermoplastic polyurethane. Moreover, the surface layer can be formed from a fluorine compound with excellent surface aggregation property without compromising the flexibility of the thermoplastic polyurethane, and the antifouling property can be improved by the surface layer.

Effect of the Invention

A surface of an article to be adhered can be protected by the laminate provided in the present invention in which the flexibility of the thermoplastic polyurethane is not compromised, excellent antifouling and adhesion properties are obtained, and glue residue is minimized.

DESCRIPTION OF THE EMBODIMENTS

Figure 1:
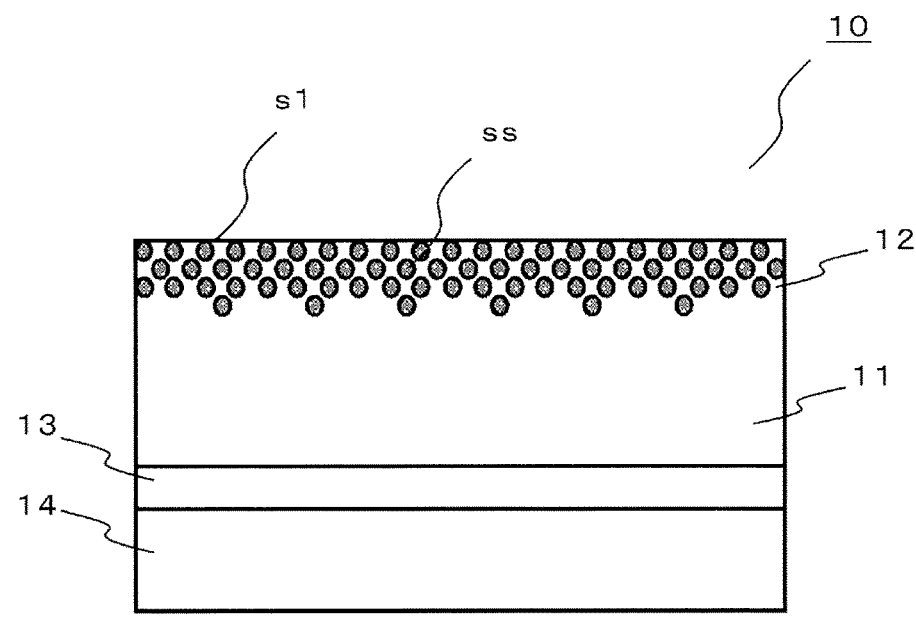
FIG. 1 shows a layered structure of a laminate 10 according to a first implementation of the present invention.

This application is based on the Japanese Patent Application No. 2014-145465 filed in Japan on Jul. 15, 2014, the content of which is incorporated in and forms a part of this application. The present invention can be fully understood from the following detailed description. Further, the scope of application of the present invention is also indicated in the following detailed description. However, the detailed description and specific embodiments are merely desirable implementations of the present invention that are provided for the purpose of illustration. It should be understood by those skilled in the art that various alterations and changes made based on the detailed description are contemplated in the spirit and scope of the present invention. The implementations are not intended to be presented exhaustively to the public, and the modifications and replacements made thereto that may be not embraced literally in the claims are also equivalently regarded as a part of the present invention.

Hereinafter, implementations of the present invention are described with reference to accompanying drawings. Moreover, the same or equivalent parts in the figures are denoted by the same or similar reference numerals, and repeated descriptions are omitted. Furthermore, the present invention is not limited to the implementations below.

[Laminate 10]

As shown in FIG. 1, a laminate 10 according to a first implementation of the present invention is provided with a substrate film 11 having a surface layer 12, and an adhesive layer 13. Upon manufacturing, the laminate 10 has a peelable film 14; however, the peelable film 14 is used and is peeled off when the laminate is attached to the surface of an article to be adhered.

[Substrate Film 11]

The substrate film 11 is desirably a film formed from a thermoplastic resin.

The thermoplastic resin includes, for example, polyurethane resins, polyester resins, acetate resins, polyethersulfone resins, polycarbonate resins, polyamide resins, polyimide resins, polyolefin resins, (meth)acrylic resins, polyvinyl chloride resins, polyvinylidene chloride resins, polystyrene resins, polyvinyl alcohol resins, polyarylate resins, polyphenylene sulfide resins, norbornene-based resins, and the like. Specifically, the thermoplastic resin is preferably thermoplastic polyurethane, polycaprolactone (PCL), acrylic polymers, polyesters, polyacrylonitrile, poly (ether-ketone), polystyrene, polyvinyl acetate or a derivative thereof. The resins may be used alone or in combination of two or more thereof.

The thickness of the substrate film 11 is not particularly limited. In a situation where the invention of this application is used as a laminate, the thickness of the substrate film is preferably 50-300 μm, and more preferably 100-200 μm. If the thickness of the substrate film is 50 μm or above, the mechanical strength of the substrate is adequate, layers may be formed on the substrate. Additionally, if the thickness of the substrate film is 300 μm or below, the thickness of the laminate will not be too large.

[Surface Layer 12]

As for the surface layer 12, a coating agent containing a curable resin composition is applied onto a surface of the substrate film 11 initially. The curable resin composition penetrates into the substrate film 11, and is mixed with a part of the substrate film 11. After being cured by drying, a part of the substrate film 11 is integrated with the curable resin composition, to form the surface layer 12. The surface layer 12 is constructed such that the content ratio of the curable resin composition gradually decreases from the surface of the surface layer 12 towards the interior of the substrate film 11. Therefore, a laminate having a high elongation at break is formed, and no cracks are produced even when the laminate is stretched. Moreover, the so called "curable resin composition" refers to the solid ingredient (active ingredient) in the coating agent. The curable resin composition contains at least one fluorine compound selected from the group consisting of fluorosilsesquioxane and fluorosilsesquioxane polymers, and a curable resin.

If the fluorine compound and the curable resin amount to 100 wt %, then the curable resin composition suitably contains 0.01-20 wt % of the fluorine compound. The content of the fluorine compound is preferably 0.1-10 wt %, and more preferably 1-5 wt %. If the content is 0.5 wt % or above, adequate antifouling property can be imparted to the surface layer 12. Furthermore, to achieve the effect of the present invention, the content of the fluorine ingredient is suitably 0.001-4 wt %, preferably 0.01-2 wt %, and more preferably 0.1-1 wt %, relative to the fluorine compound and the curable resin of 100 wt %.

For the coating of the coating agent containing the curable resin composition, it is preferable to use a wet coating method in which the fluorine compound and the curable resin are uniformly coated. The wet coating method may be a gravure coating method or a die coating method. Further, in the present application, the coating agent may contain no solvent, but only the fluorine compound and the curable resin, and may also be a mixture with a solvent or the like.

The gravure coating method is a method in which an engraved gravure roll having an embossed surface is dipped in a coating solution, and the coating agent attached to the concavo-convex portions on the surface of the gravure roll is scraped off by a doctor blade. The solution is accumulated in the concave portions and is thus accurately metered and transferred to the substrate. By the gravure coating method, a low-viscosity solution can be thinly coated.

The die coating method is a method in which a solution is extruded under pressure from a coating head which is called a die, and coated. By the die coating method, high-precision coating can be realized. Further, the solution is not exposed to the ambient air upon coating, so the concentration of the coating agent is unlikely to change due to drying.

Other wet coating methods include for example spin coating, bar coating, reverse roll coating, roll coating, slit coating, dipping, spray coating, kiss coating, reverse kiss coating, air knife coating, curtain coating, and rod coating. The coating method may be appropriately selected from these methods depending on the film thickness desired. Further, by using the wet coating method, the coating can be carried out at a linear speed of several tens of meters per minute (for example, about 20 in/min), and thus massive production can be achieved with an increased production efficiency.

Curable Resin

The curable resin contained in the curable resin composition is a resin that is cured by irradiation with UV rays, irradiation with an electron beam, and heating etc. Examples of the curable resin include silicone resins, acrylic resins, methacrylic resins, epoxy resins, melamine resins, unsaturated polyester resins, urethane resins, polyimides, polyetherimides, polyamide-imides, phenolic resins, alkyd resins, urea resins, bismaleimide resins, polyester urethane resins, polyether urethane resins, and the like. Among these curable resins, the active energy ray-curable resins that can be cured in a short time by the active energy ray are preferred in view of the productivity. The so-called "active energy ray" as used herein means energy rays by which a compound capable of producing an active species is decomposed to produce an active species. Examples of such active energy rays include visible light, UV rays, IR rays, X-rays, α-rays, β-rays, γ-rays, electron beams, and other active energy rays. UV curable resins are more preferred. The UV curable resin is usually added with a photopolymerization initiator. Examples of the photopolymerization initiator include various benzoin derivatives, benzophenone derivatives, phenylketone derivatives and the like. The amount of the photopolymerization initiator added is preferably 1 to 10 parts by weight based on 100 parts by weight of the UV curable resin Specific examples of the curable resin include (meth) acrylate monomers, unsaturated polyester resins, polyester (meth)acrylate resins, epoxy (meth)acrylate resins, urethane (meth)acrylate resins, and other resins having an unsaturated bond capable of radical polymerization. These resins may be used alone or in combination of two or more thereof. Particularly preferred is a resin having one or more (meth) acryloyl groups.

(Meth)acrylate Monomers

Examples of (meth)acrylate monomers include compounds obtained by reacting an α,β-unsaturated carboxylic acid with a polyhydric alcohol, for example, polyalkylene glycol di(meth)acrylate, ethylene glycol (meth)acrylate, propylene glycol (meth)acrylate, polyethylene-polytrimethylolpropane di(meth)acrylate, trimethylolpropane tri(meth)acrylate, trimethylolpropane ethoxytri(meth)acrylate, trimethylolpropane diethoxytri(meth)acrylate, trimethylolpropane triethoxytri(meth)acrylate, trimethylolpropane tetraethoxytri(meth)acrylate, trimethylolpropane pentaethoxytri(meth)acrylate, tetramethylolmethane tetra(meth)acrylate, tetramethylolpropane tetra(meth)acrylate, pentaerythritol tri(meth)acrylate, pentaerythritol tetra(meth)acrylate, pentaerythritol penta(meth)acrylate, dipentaerythritol penta(meth)acrylate, dipentaerythritol hexa(meth)acrylate. Examples also include compounds having a silsesquioxane skeleton with (meth)acrylate functional groups.

Unsaturated Polyester Resins

Examples of unsaturated polyester resins include resins obtained by dissolving a condensation product (unsaturated polyester) produced from an esterification reaction of a polyhydric alcohol with an unsaturated polybasic acid (and optionally a saturated polybasic acid) in a polymerizable monomer.

The unsaturated polyester may be produced by polycondensing an unsaturated acid such as maleic anhydride with a diol such as ethylene glycol. Specific examples include unsaturated polyesters produced by reacting a polybasic acid having a polymerizable unsaturated bond such as fumaric acid, maleic acid, or itaconic acid, or an anhydride thereof, as an acid component with a polyhydric alcohol such as ethylene glycol, propylene glycol, diethylene glycol, dipropylene glycol, 1,2-butanediol, 1,3-butanediol, 1,5-pentanediol, 1,6-hexanediol, 2-methyl-1,3-propanediol, 2,2-dimethyl-1,3-propanediol, cyclohexane-1,4-dimethanol, an ethylene oxide adduct of bisphenol A, and a propylene oxide adduct of bisphenol A as an alcohol component, where a polybasic acid having no polymerizable unsaturated bond, such as phthalic acid, isophthalic acid, terephthalic acid, tetrahydrophthalic acid, adipic acid or sebacic acid, or an anhydride thereof is additionally optionally added as an acid component.

Polyester (meth)acrylate Resins

Examples of polyester (meth)acrylate resins include (1) (meth)acrylate obtained by reacting an epoxy compound containing an α,β-unsaturated carboxylate group with a polyester terminated with a carboxyl group obtained from a saturated polybasic acid and/or an unsaturated polybasic acid and a polyhydric alcohol; (2) (meth)acrylate obtained by reacting a hydroxyl group-containing acrylate with a polyester terminated with a carboxyl group obtained from a saturated polybasic acid and/or an unsaturated polybasic acid and a polyhydric alcohol; and (3) (meth)acrylate obtained by reacting (meth)acrylic acid with a polyester terminated with a hydroxyl group obtained from a saturated polybasic acid and/or an unsaturated polybasic acid and a polyhydric alcohol.

Examples of the saturated polybasic acid useful as a raw material for preparing the polyester (meth)acrylate include a polybasic acid having no polymerizable unsaturated bond such as phthalic acid, isophthalic acid, terephthalic acid, tetrahydrophthalic acid, adipic acid, or sebacic acid, or an anhydride thereof, and a polymerizable unsaturated polybasic acid such as fumaric acid, maleic acid, and itaconic acid, or an anhydride thereof. Further, the polyol component is the same as those mentioned for the unsaturated polyester above.

Epoxy-(meth)acrylate Resins

Examples of epoxy (meth)acrylate resins include resins obtained by dissolving a compound having a polymerizable unsaturated bond (vinyl ester) formed by ring-opening reaction of a compound having a glycidyl group with a carboxyl group of a carboxyl compound having a polymerizable unsaturated bond such as acrylic acid in a polymerizable monomer.

The vinyl ester is produced by a generally known method, and examples include an epoxy (meth)acrylate obtained by reacting an unsaturated monobasic acid such as acrylic acid or methacrylic acid with an epoxy resin.

In addition, a bisphenol (e.g., type A) or a dibasic acid such as adipic acid, sebacic acid, and a dimer acid (Haridimer 270S, Harima Chemicals Group, Inc.) may be reacted with various epoxy resins to impart the flexibility.

Examples of the epoxy resin used as the raw material include bisphenol A diglycidyl ether and its high molecular weight homologs, and Novolac glycidyl ethers.

Urethane (meth)acrylate Resins

The urethane (meth)acrylate resin is an active energy ray-curable resin having a (meth)acryloyl group and having an urethane skeleton, and examples include UV curable resins. It is particularly preferred that the urethane (meth)acrylate resin can impart bendability (flexibility) to the cured film.

The urethane (meth)acrylate resin may also be an oligomer, prepolymer, or polymer containing a radical-polymerizable unsaturated group, obtainable by reacting polyisocyanate with a polyhydroxy compound or a polyhydric alcohol, and then further reacting with a hydroxyl group-containing (meth)acrylic compound. A polycarbonate polyol based urethane acrylate in which the polyol used is a polycarbonate polyol is particularly preferred. By using a polycarbonate polyol based urethane acrylate, the formed cured film can provide excellent stretchability and toughness.

Specific examples of the polyisocyanate include 2,4-methylphenylene diisocyanate and an isomer thereof, diphenylmethane diisocyanate, hexamethylene diisocyanate, hydrogenated xylylene diisocyanate, isophorone diisocyanate, xylylene diisocyanate, dicyclohexylmethane diisocyanate, naphthalene diisocyanate, triphenylmethane triisocyanate, Barnock D-750 (trade name, manufactured by DIC Corporation), Crisvon NK (trade name, manufactured by DIC Corporation), Desmodule L (trade name, manufactured by Sumitomo Bayer Urethane Co. Ltd), Coronate L (trade name, manufactured by Nippon Polyurethane Industry Co., Ltd), Takenate D102 (trade name, manufactured by Mitsui Takeda Chemical Co., Ltd), Isonate 143L (trade name, manufactured by Mitsubishi Chemical Corporation) and the like.

Examples of the polyhydroxy compound include polyester polyols, polyether polyols, polycarbonate polyols, polycaprolactone polyols and the like. Specific examples include an ethylene oxide adduct of glycerol, a propylene oxide adduct of glycerol, a tetrahydrofuran adduct of glycerol, an ethylene oxide and propylene oxide adduct of glycerol, an ethylene oxide adduct of trimethylolpropane, a propylene oxide adduct of trimethylolpropane, a tetrahydrofuran adduct of trimethylolpropane, an ethylene oxide and propylene oxide adduct of trimethylolpropane, an ethylene oxide adduct of dipentaerythritol, a propylene oxide adduct of dipentaerythritol, a tetrahydrofuran adduct of dipentaerythritol, an ethylene oxide and propylene oxide adduct of dipentaerythritol, and the like.

Specific examples of the polyhydric alcohols include ethylene glycol, diethylene glycol, triethylene glycol, polyethylene glycol, propylene glycol, dipropylene glycol, polypropylene glycol, 2-methyl-1,3-propanediol, 1,3-butylene glycol, adducts of bisphenol A with propylene oxide or ethylene oxide, 1,2,3,4-tetrahydroxybutane, glycerol, trimethylolpropane, 1,2-cyclohexanediol, 1,3-cyclohexanediol, 1,4-cyclohexanediol, p-xylylene glycol, dicyclohexyl-4,4-diol, 2,6-decahydronaphthalenediol, 2,7-decahydronaphthalene diol and the like.

The hydroxyl group-containing (meth)acrylic compound is not particularly limited, and preferably a hydroxyl group-containing (meth)acrylate. Specific examples include 2-hydroxyethyl (meth)acrylate, 2-hydroxypropyl (meth)acrylate, 3-hydroxybutyl (meth)acrylate, polyethylene glycol mono (meth)acrylate, polypropylene glycol mono(meth)acrylate, tris(hydroxyethyl)isocyanuric acid di(meth)acrylate, pentaerythritol tri(meth)acrylate and the like.

The urethane (meth)acrylate resin may be synthesized by a generally known method. As an example, the urethane (meth)acrylate resin can be obtained by reacting given amounts of an organic polyisocyanate (a) and a polycarbonate polyol (b) at 70 to 80° C. in a manner such that the residual isocyanate concentration becomes a given value, then adding a given amount of an (meth)acrylate (c) containing one or more hydroxyl groups in the molecule, and reacting at 70 to 80° C. in the presence of a polymerization inhibitor (for example, hydroquinone monomethyl ether), until the residual isocyanate concentration is 0.1 wt % or less.

The weight average molecular weight (Mw) of the urethane (meth)acrylate resin is in the range of 3,000 to 500,000, and preferably 5,000 to 200,000. By setting the Mw in this range, flexibility of the cured film can be imparted. In case that the Mw is 3,000 or more, the cross-linking density in the cured film will not become too high.

The curable resin contained in the curable resin composition is preferably at least one compound having a (meth)acryloyl group.

The molecular weight of the compound having a (meth)acryloyl group is 50 to 30,000, and more preferably 50 to 5,000. The compound having a (meth)acryloyl group and having a molecular weight of 50 to 30,000 easily penetrates into the thermoplastic polyurethane and is integrated with the thermoplastic polyurethane without impairing the flexibility of the conventional thermoplastic polyurethane.

In the curable resin contained in the curable resin composition, a compound having a (meth)acryloyl group that is different from the resin may be additionally added, or the resin itself may be a compound having a (meth)acryloyl group, provided that the molecular weight is in a suitable range. The content of the (meth)acryloyl group-containing compound in the curable resin is 40 to 100 wt %, and preferably 50 to 100 wt %.

In addition to the curable resin having a (meth)acryloyl group, for example, active energy ray-curable or heat-curable cationically polymerizable resins, anionically polymerizable resins, addition polymerizable resins, polycondensable resins, ring-opening polymerizable resins, heat-curable resins having no cationic polymerizablility, and the like may be mentioned.

Examples of the cationically and anionically polymerizable resin include compounds having a cationically polymerizable functional group such as vinyl ether group, propenyl ether group, oxetanyl, oxiranyl, and vinylaryl, and compounds having an anionically polymerizable functional group such as vinylcarboxyl, cyanoacryloyl and the like.

Examples of the cationically polymerizable resin include epoxy resins such as bisphenol type epoxy resins, novolac type epoxy resins, alicyclic epoxy resin and aliphatic epoxy resin, or oxetane resins, and vinyl ether resins.

Examples of the addition polymerizable resin, the polycondensable resin, and the ring-opening polymerizable resin include the following.

The addition-polymerizable resin includes active hydrogen-containing compounds from which for example polyurethane can be produced by polymerization. Examples include low molecular weight glycols [e.g. ethylene glycol, propylene glycol, 1,4-butanediol, 1,6-hexanediol and the like]; polyether diols [e.g. the alkylene oxide (ethylene oxide, propylene oxide, and butylene oxide, etc.) adducts of the exemplified low molecular weight glycols, and the ring-opened polymers of alkylene oxides (e.g. polytetramethylene glycol)]; polyester diols [e.g. condensed polyester diols of aliphatic dicarboxylic acids (adipic acid, maleic acid, and linolenic acid dimer, etc.) or aromatic dicarboxylic acids (phthalic acid, terephthalic acid and the like) with the exemplified low molecular weight glycols, and polylactone diols obtained from ring-opening polymerization of ε-caprolactone]; and low molecular weight diamines (isophorone diamine, 4,4'-diaminodicyclohexylmethane, 4,4'-diamino-3,3'-dimethyldicyclohexylmethane, etc.). Moreover, examples of the diisocyanate include aromatic diisocyanates (tolylene diisocyanate, bitolylene diisocyanate, naphthalene diisocyanate, diphenylmethane diisocyanate and the like), alicyclic diisocyanates (isophorone diisocyanate, dicyclohexylmethane diisocyanate, cyclohexane diisocyanate, methylcyclohexane diisocyanate and the like), and aliphatic diisocyanates (hexamethylene diisocyanate and the like). Also, for example, the combinations with trifunctional or higher compounds containing active hydrogen (e.g. polyhydric alcohols such as trimethylolpropane, pentaerythritol, and sorbitol; polyamines such as diethylenetriamine and triethylenetetramine; and amino alcohols such as triethanolamine, and so on) and/or trifunctional or higher polyisocyanates [e.g. triphenylmethane triisocyanate, tris(isocyanatophenyl) thiophosphate, a 1:3 adduct of trimethylolpropane:hexamethylene diisocyanate, a cyclic trimer of hexamethylene diisocyanate, and so on] may be mentioned.

Examples of the epoxy compound include glycidyl ether compounds of phenol (diglycidyl ethers of bisphenol A, and bisphenol F etc.), glycidyl ether compounds (diglycidyl ether, glycerol triglycidyl ether, polyallyl glycidyl ether, and the like); glycidyl ester compounds [copolymers of glycidyl (meth)acrylate and ethylenically unsaturated monomers (acrylonitrile and the like), and so on]; glycidyl amines (glycidyl ether of p-aminophenol and the like); and non-glycidyl epoxy compounds (epoxidized polyolefins, epoxidized soybean oil, etc.), and the like.

Examples of the epoxy curing agent include polyamines and polycarboxylic acids (anhydrides).

Examples of the polyamines include aliphatic polyamines (alkylenediamines such as ethylenediamine and tetramethylenediarnine; polyalkylene polyamines such as diethylenetriamine and triethylenetetramine; alkyl- or hydroxyalkylamines such as alkylaminopropylamrine and aminoethylethanolamine; aliphatic amines containing an aromatic ring such as xylylene diamine; and polyether polyamines such as polyoxypropylene polyamine, etc.); aliphatic polyamines containing an alicyclic or heterocyclic ring (N-aminoethylpiperazine, 1,3-diaminocyclohexane, and isophoronediamine, etc.); aromatic polyamines (phenylenediamine, tolylenediamine, diaminodiphenylmethane, etc.); polyamide polyamines (condensates of said polyamines with dimer acids); benzoguanamine and/or alkylguanamine and modified products thereof, and dicyandiamide, etc.

The polycondensable resins include, for example, polymers of aliphatic dicarboxylic acid esters from which for example polyesters can be produced by polymerization (e.g. polybutylene adipate, and polyethylene adipate, etc.); polycarbonate; and co-esterification products of two or more thereof, or co-condensation polymers of the compounds forming the polymers with alkylene oxides (polyethylene glycol, and polypropylene glycol, etc.), and trifunctional or higher low molecular weight cross-linking agents (e.g. trimethylolpropane, glycerol, and trimellitic acid, etc.).

Examples of the polyamide include nylon 6, nylon 6,6, nylon 6,10, nylon 11, nylon 12 and nylon 4,6, and co-amidation compounds of two or more thereof or co-condensation polymers of the compounds forming the polymers with the compounds forming the polyesters or alkylene oxides (such as polyethylene glycol and polypropylene glycol, etc), and a trifunctional or higher low molecular weight crosslinking agent (e.g. trimellitic acid)

Examples of the polyimides include polycondensates of pyromellitic acid and 1,4-diaminobenzene; and the co-condensation polymers of the compounds forming the polyimides and the compounds forming the polyamides, which is polyamide-imides. In addition to these compounds having two or less functional groups in the molecule, a polymerizable compound having three or more functional groups and forming a crosslinked structure by polymerization is also included. Examples include the combinations with trifunctional or higher compounds containing active hydrogen (e.g. polyhydric alcohols such as trimethylolpropane, pentaerythritol and sorbitol; polyarnines such as diethylenetriamine and triethylenetetramine; and amino alcohols such as triethanolamine), and trimellitic acid and/or trifunctional or higher polyisocyanates [triphenylmethane triisocyanate, tris (isocyanatophenyl)thiophosphate, a 1:3 adduct of trimethylolpropane:hexamethylene diisocyanate, a cyclic trimer of hexamethylene diisocyanate, and so on].

Examples of the ring-opening polymerizable resin include lactones such as γ-butyrolactone, δ-valerolactone, β-methyl-δ-valerolactone, and ε-caprolactone and lactams such as ε-caprolactam, enantholactam, and lauryl lactam.

Examples of the resin cured by reactions other than radical polymerization include silsesquioxane derivatives represented by the following Formulas (A-1) to (A-3).

[Chemical Formula 1]

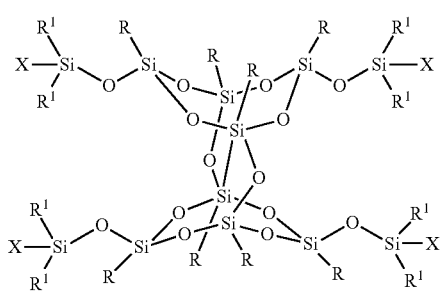

(A-1)

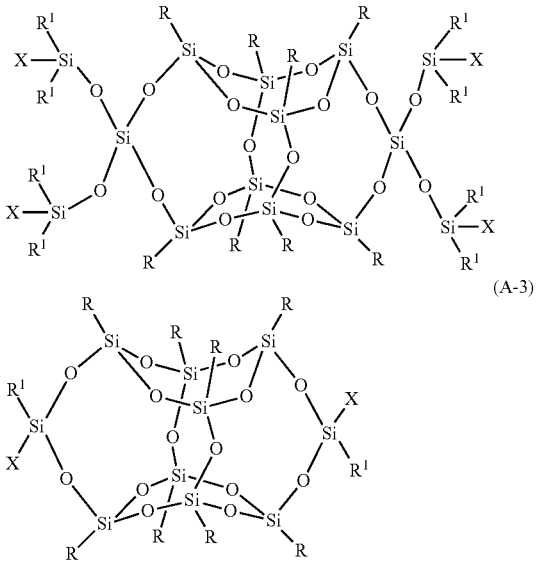

In Formulas (A-1)-(A-3), R is each independently hydrogen, $C_{1-45}$ alkyl in which any hydrogen can be substituted with fluoro and nonadjacent —$CH_2$— can be substituted with —O— or cycloalkylene, $C_{4-8}$ cycloalkyl, and substituted or unsubstituted aryl. In the phenyl ring of a substituted aryl group, any hydrogen can be substituted with $C_{1-10}$ alkyl, halo or fluoro. $R^1$ is each independently a group selected from $C_{1-4}$ alkyl, cyclopentyl, cyclohexyl, and phenyl. At least one X is hydrogen or a radical having a polymerizable function group, and the other X(s) is/are a group as defined for $R^1$. Where R is hydrogen, only one X is hydrogen. Where X is a polymerizable function group, preferably at least two X are a polymerizable function group.

These compounds can be synthesized by a generally known production method, for example, as described in Japanese Patent No. 5050473.

Moreover, the polymerizable group of the radical having a polymerizable functional group represented by X is not particularly limited as long as it is a functional group capable of addition polymerization, ring-opening polymerization or polycondensation. Examples include oxiranyl, oxiranylene, 3,4-epoxycyclohexyl, oxetanyl, oxetanylene, an acrylate group or a methacrylate group, alkenyl, amino, 2-oxapropane-1,3-dioyl, and the like. Furthermore, where a plurality of polymerizable functional groups is present, they may be the same or different groups.

Specific examples include groups represented by Formulas (a)-(h) below.

[Chemical Formula 2]

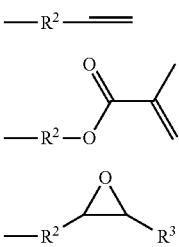

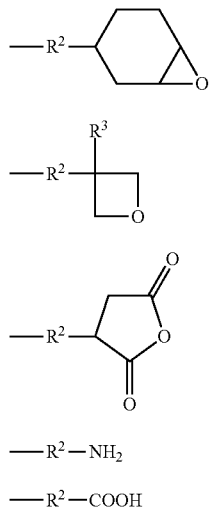

In Formulas (a)-(h), $R^2$ is $C_{1-10}$ alkylene, and preferably $C_{1-6}$ alkylene, in which one —$CH_2$— may be substituted with —O— or 1,4-phenylene. $R^3$ is hydrogen or $C_{1-6}$ alkyl, and preferably hydrogen.

Examples of the heat-curable resins having no cationic polymerizablility include phenolic resins, alkyd resins, melamine resins, epoxy resins, urea resins, unsaturated polyester resins, urethane resins, heat-curable polyimides and silicone resin. These resins may be used alone or in combination of two or thereof.

Particularly, in terms of the processability, preferred are urethane resins obtainable by reaction of an epoxy resin such as a bisphenol A type epoxy resin, a bisphenol F type epoxy resin, a polyfunctional epoxy resin, a flexible epoxy resin, a brominated epoxy resin, a glycidyl ester type epoxy resin, a high molecular weight epoxy resin, and a biphenyl type epoxy resin; melamine resins such as a methylated melamine resin, a butylated melamine resin, a methyl etherified melamine resin, a butyl etherified melamine resin, and a methyl-butyl mixed etherified melamine resin; polyisocyanate compounds having two or more isocyanate groups (O=C=NRN=C=O), polyhydric alcohols having two or more hydroxyl groups (HO—R'—OH), polyamines ($H_2N$—R"—$NH_2$), or compounds having active hydrogen such as water ($NH_2$, —NH, —CONH—).

The epoxy resins are excellent in heat resistance and chemical resistance, the melamine resins are excellent in heat resistance, hardness and transparency, and the urethane resins are excellent in low-temperature curability, which can be selected appropriately.

The resin cured by reactions other than radical polymerization is particularly preferably a cationically polymerizable resin. By the use of cationic polymerization, the curing reaction can be accelerated, which is preferred during production. In addition, the cationic polymerization may be conducted by heating or irradiating, which can be appropriately selected depending on the species of the cationic polymerization initiator used.

The content of the resin cured by reactions other than radical polymerization depends on the species of the resin or the property to be imparted to the cured film. For example, the content of the resin cured by reactions other than radical polymerization is preferably 10 to 90 wt %, and more preferably 20 to 70 wt % based on the total weight (100 wt %) of the resin composition forming the cured film. If the content of the resin cured by reactions other than radical polymerization is 10 to 90 wt %, then the cured film can maintain excellent hardness, toughness and heat resistance.

The photopolymerization initiator is not particularly limited, as long as it is an initiator capable of generating free radicals by utilizing an active energy ray.

The compounds which can be used as the active energy ray polymerization initiators are benzophenone, Michler's ketone, 4,4'-bis (diethylamino) benzophenone, xanthone, thioxanthone, isopropyl xanthone, 2,4-diethylthioxanthone, 2-ethylanthraquinone, acetophenone, 2-hydroxy-2-methylpropiophenone, 2-hydroxy-2-methyl-4'-isopropylpropiophenone, 1-hydroxycyclohexylphenyl ketone, benzoin isopropyl ether, benzoin isobutyl ether, 2,2-diethoxyacetophenone, 2,2-dimethoxy-2-phenylacetophenone, camphorquinone, benzanthrone, 2-methyl-1-[4-(methylthio)phenyl]-2-morpholinylpropan-1-one, 2-benzyl-2-dimethylamino-1-(4-morpholinylphenyl)-butanone-1, ethyl 4-dimethylaminobenzoate, isopentyl 4-dimethylaminobenzoate, 4,4'-bis(t-butylperoxycarbonyl)benzophenone, 3,4,4'-tris(t-butylperoxycarbonyl)benzophenone, 2,4,6-trimethylbenzoyldiphenylphosphine oxide, 2-(4'-methoxystyryl)-4,6-bis(trichloromethyl)-s-azine, 2-(3',4'-dimethoxystyryl)-4,6-bis(trichloromethyl)-s-azine, 2-(2',4'-dimethoxystyryl)-4,6-bis(trichloromethyl)-s-azine, 2-(2'-methoxystyryl)-4,6-bis(trichloromethyl)-s-azine, 2-(4'-pentoxystyryl)-4,6-bis(trichloromethyl)-s-azine, 4-[p-N,N-bis(ethoxycarbonylmethyl)]-2,6-bis(trichloromethyl)-s-azine, 1,3-bis(trichloromethyl)-5-(2'-chlorophenyl)-s-azine, 1,3-bis(trichloromethyl)-5-(4'-methoxyphenyl)-s-azine, 2-(p-dimethylaminostyryl)benzoxazole, 2-(p-dimethylaminostyryl)benzothiazole, 2-mercaptobenzothiazole, 3,3'-carbonylbis(7-diethylaminocoumarin), 2-(o-chlorophenyl)-4,4',5,5'-tetraphenyl-1,2'-biimidazole, 2,2'-bis(2-chlorophenyl)-4,4',5,5'-tetrakis(4-ethoxycarbonylphenyl)-1,2'-biimidazole, 2,2'-bis(2,4-dichlorophenyl)-4,4',5,5'-tetraphenyl-1,2'-biimidazole, 2,2'-bis(2,4-dibromophenyl)-4,4',5,5'-tetraphenyl-1,2'-biimidazole, 2,2'-bis(2,4,6-trichlorophenyl)-4,4',5,5'-tetraphenyl-1,2'-biimidazole, 3-(2-methyl-2-dimethylaminopropionyl)carbazole, 3,6-bis(2-methyl-2-morpholinylpropionyl)-9-n-dodecylcarbazole, 1-hydroxycyclohexylphenyl ketone, bis(η5-2,4-cyclopentadien-1-yl)-bis(2,6-difluoro-3-(1H-pyrrol-1-yl)-phenyl)titanium, 3,3',4,4'-tetrakis(t-butylperoxycarbonyl)benzophenone, 3,3',4,4'-tetrakis(t-hexylperoxycarbonyl)benzophenone, 3,3'-bis(methoxycarbonyl)-4,4'-bis(t-butylperoxycarbonyl)benzophenone, 3,4'-bis(methoxycarbonyl)-4,3'-bis(t-butylperoxycarbonyl)benzophenone, 4,4'-bis(methoxycarbonyl)-3,3'-bis(t-butylperoxycarbonyl)benzophenone, and so on. The compounds may be used alone, or in a mixture of two or more thereof.

The content of the radical polymerization initiator is preferably 0.01-20 wt % and more preferably 1-10 wt %, based on the total weight (100 wt %) of the radical polymerizable resin.

The cationic polymerization initiator is not particularly limited as long as it is a compound capable of releasing a cationic polymerization-initiating substance by irradiation with an active energy ray or by heating. Examples of the curing initiator include a carboxylic acid, an amine, an anhydride compound or an acid generator, and preferably a complex or a derivative thereof which is an onium salt able to release a Lewis acid.

Representative examples of the curing reaction initiating agent include salts of cations and anions as shown in Formula (1) below:

$$[A]^{m+}[B]^{m-} \quad (1).$$

In Formula (1), the cation $[A]^{m+}$ is preferably an onium ions, represented for example by Formula (2) below:

$$[(\alpha)_a Q]^{m+} \quad (2).$$

In Formula (2), α is an organic group having 1 to 60 carbon atoms and containing several atoms other than carbon, and a is an integer of 1 to 5. The a and α are independent, and may be the same or different. In addition, preferably at least one a is an organic group having an aromatic ring.

Q is an atom or an atomic group selected from the group consisting of S, N, Se, Te, P, As, Sb, Bi, O, I, Br, Cl, F, and N=N. Furthermore, when Q in the cation $[A]^{m+}$ is set to have a valency of q, m=a−q (where the valence is 0 for N=N).

Moreover, the anion $[B]^{m-}$ is preferably a halide complex represented by Formula (3) below:

$$[LX_b]^m \quad (3)$$

In Formula (3), L is a metal or metalloid that is the central atom of the halide complex, and is B, P, As, Sb, Fe, Sn, Bi, Al, Ca, In, Ti, Zn, Sc, V, Cr, Mn, and Co etc. X is a halogen, b is an integer of 3 to 7. Moreover, when L in the anion $[LX_b]^{m-}$ is set to have a valency of p, m=b−p.

Specific examples of the anion $[LB]^{m-}$ represented by Formula (3) include tetrafluoroborate ($BF_4$), hexafluorophosphate ($PF_6$), hexafluoroantimonate ($SbF_6$), hexafluoroarsenate ($AsF_6$), hexachloroantimonate ($SbCl_6$), and so on.

Further, the anion $[B]^{m-}$ is preferably an anion represented by Formula (4) below, in which L, X, and b are as defined above.

$$[LX_{b-1}(OH)]^{m-} \quad (4)$$

Examples of the anion $[B]^{m-}$ further include perchlorate ion ($ClO_4$)$^-$, trifluoromethylsulfite ion ($CF_3SO_3$)$^-$, fluorosulfonate ion ($FSO_3$)$^-$, toluenesulfonate anion, trinitrobenzenesulfonate anion etc.

Among the onium salts, the curing reaction initiator of the present invention is more preferably an aromatic onium salt exemplified in (A) to (C) below. These aromatic onium salts may be used alone or in a mixture of two or more thereof.

(A) Aromatic onium salt such as phenyldiazonium hexafluorophosphate, 4-methoxyphenyldiazonium hexafluoroantimonate, and 4-methylphenyldiazonium hexafluorophosphate.

(B) Diaryl iodonium salts such as diphenyliodonium hexafluoroantimonate, bis(4-methylphenyl)iodonium hexafluorophosphate, and bis(4-t-butylphenyl)iodonium hexafluorophosphate.

(C) Triaryl sulfonium salts such as triphenylsulfonium hexafluoroantimonate, tris(4-methoxyphenyl)sulfonium hexafluorophosphate, diphenyl-4-thiophenoxyphenylsulfonium hexafluoroantimonate, diphenyl-4-thiophenoxyphenylsulfonium hexafluorophosphate, 4,4'-bis(diphenylsulfonio)phenyl sulfide-bis-hexafluoroantimonate, 4,4'-bis(diphenylsulfonio)phenyl sulfide-bis-hexafluorophosphate, 4,4'-bis[bis(β-hydroxyethoxy)phenylsulfonio]phenyl sulfide-bis-hexafluoroantimonate, 4,4'-bis[bis(β-hydroxyethoxy)phenylsulfonio]phenyl sulfide-bis-hexafluorophosphate, 4-[4'-(benzoyl)phenylthio]phenyl-bis-(4-fluorophenyl)sulfonium hexafluoroantimonate, and 4-[4'-(benzoyl)phenylthio]phenyl-bis-(4-fluorophenyl)sulfonium hexafluorophosphate.

Further, the curing reaction initiator of the present invention may be a mixture of an iron-aromatic hydrocarbon complex or an aluminum complex and a silanol such as triphenylsilanol.

Examples of the iron-aromatic hydrocarbon complex include ($\eta^5$-2,4-cyclopentadien-1-yl)[(1,2,3,4,5,6-$\eta$)-(1-methylethyl)benzene]-iron hexafluorophosphate, and examples of the aluminum complex include tris(acetyl acetonato) aluminum, tris(ethylacetoacetato)aluminum, and tris(salicylaldehyde) aluminum.

In the above description, the curing reaction initiators in the embodiments of the present invention are preferably aromatic iodonium salts, aromatic sulfonium salts, and iron-arene complexes from the viewpoint of practical use.

Examples of the cationic polymerization initiator that generates cationic species by irradiation with ultraviolet rays include hexafluoroantimonate, pentafluorohydroxyantimonate, hexafluorophosphate, and hexafluoroarsenate. The cationic polymerization initiator may also be, for example, UVACURE 1590 (trade name, manufactured by Daicel-Cytec Co., Ltd), CD-1010, CD-1011, and CD-1012 (trade names, manufactured by Sartomer USA, LLC), Irgacure 264 (trade name, manufactured by BASF), CIT-1682 (trade name, manufactured by Nippon Soda Co., Ltd.), and other commercially available products.

Examples of the cationic polymerization initiator that generates a cationic species by heating include an aryl diazonium salt, an aryl iodonium salt, an aryl sulfonium salt, and an aromatic hydrocarbon-ion complex. The cationic polymerization initiator may be preferably, for example, PP-33, CP-66, CP-77 (trade names, manufactured by ADEKA Corporation), FC-509 (trade name, manufactured by 3M Company), UVE1014 (trade name, manufactured by G.E.), Sun-aid SI-60L, Sun-aid SI-80L, Sun-aid SI-100L, Sun-aid SI-110L, and Sun-aid SI-150L (trade names, manufactured by Sanshin Chemical Industry Co., Ltd.), CG-24-61 (trade name, Manufactured by BASF Japan), and other commercially available products. Further, the cationic polymerization initiator may also be a complex of a chelate compound of a metal such as aluminum or titanium with acetoacetic acid or a diketone and a silanol compound such as triphenylsilanol, or complex of a chelate compound of a metal such as aluminum or titanium with acetoacetic acid or a diketone and a phenol such as bisphenol S.

Particularly, Sun-aid SI-60L is preferred, because the heating temperature upon curing can be set at a relatively low temperature (80 to 150° C.), the storage stability is excellent, and the film forming property is good.

The content of the cationic polymerization initiator is preferably 0.01 to 20 wt % and more preferably 0.2 to 10 wt % based on the total weight of the cationically polymerizable resin (100 wt %).

The curable resin used in the coating agent of the present application may be dissolved in a solvent such as an organic solvent. The solvent is not particularly limited, and a common organic solvent may be used.

Specific examples of the solvent include a hydrocarbon solvent (e.g. benzene, and toluene), an ether solvent (e.g. diethyl ether, tetrahydrofuran, diphenyl ether, anisole, and dimethoxybenzene), a halogenated hydrocarbon solvent (e.g. dichloromethane, chloroform, and chlorobenzene), a ketone solvent (e.g. acetone, methyl ethyl ketone, and methyl isobutyl ketone), an alcohol solvent (e.g. methanol, ethanol, propanol, isopropanol, butanol, and t-butanol), a nitrile solvent (e.g. acetonitrile, propionitrile, and benzonitrile), an ester solvent (e.g. ethyl acetate, and butyl acetate), a carbonate solvent (e.g. ethylene carbonate, and propylene carbonate), an amide solvent (e.g., N,N-dimethylformamide, and N,N-dimethylacetamide), a hydro-chlorofluorocarbon solvent (e.g. HCFC-141b, HCFC-225), a hydrofluorocarbon (HFC) solvent (e.g., $C_{2-4,\ 5,\ 6}$ and higher HFCs), a perfluorocarbon solvent (e.g. perfluoropentane, and perfluorohexane), an alicyclic hydrofluorocarbon solvent (e.g. fluorocyclopentane, and fluorocyclopentane), an oxygen-containing fluorinated solvent (e.g. fluoroether, fluoropolyether, fluoroketone, and fluoroalcohol), a fluorinated aromatic solvent (e.g. α,α,α-trifluorotoluene, and hexafluorobenzene), and water. These solvents may be used alone or in combination of two or more thereof.

The content of the solvent is from 20 to 500 parts by weight, and preferably 50 to 300 parts by weight based on the total weight (100 parts by weight) of the resin composition forming the cured film.

In addition to the above components, additives may be added to the coating agent. For example, in order to impart hardness and scratch resistance to the film, a filler may be added, and a leveling agent may be added to improve the coatability. Additionally an anti-weathering agent, a defoamer and other additives may also be added.

More specifically, the coating agent may further contain any one of an active energy ray sensitizer, a polymerization inhibitor, a polymerization initiation promoter, and a polymerization initiator, a leveling agent, a wetting agent, a surfactant, a plasticizer, an UV absorber, an antioxidant, an antistatic agent, a silane coupling agent, an inorganic filler represented by silica or alumina, and an organic filler, or the like, provided that they do not adversely affect the effect of the cured film formed from the coating agent.

Examples of the leveling agent include commercially available surface conditioning agents such as BYK-350, BYK-352, BYK-354, BYK-356, BYK-381, BYK-392, BYK-394, BYK-3441, BYK-3440, and BYK-3550 (trade names, manufactured by BYK Chemie Japan Co., Ltd.).

Examples of the anti-weathering agent include benzotriazoles, hydroxyphenyltriazines, benzophenones, salicylates, cyanoacrylates, triazines, or dibenzoylresorcinol. These ultraviolet absorbers may be used alone or in combination of more than one thereof. The ultraviolet absorber is preferably one or a combination of the ultraviolet absorbers that can be appropriately selected depending on the wavelength of the ultraviolet ray to be absorbed.

In the coating agent, a silicon compound may be added as a surface modification component A common surface modifier having a silicone compound as a main ingredient may be used. The silicone compound includes, for example, BYK-UV3500, and BYK-UV-3570 (trade names, manufactured by BYK Chemie Japan Co., Ltd.), TEGO Rad 2100, TEGO Rad 2200N, TEGO Rad 2250, TEGO Rad 2500, TEGO Rad 2600, and TEGO Rad 2700 (trade names, manufactured by Evonic Degussa Japan Co., Ltd.), X-22-2445, X-22-2455, X-22-2457, X-22-2458, X-22-2459, X-22-1602, X-22-1603, X-22-1615, X-22-1616, X-22-1618, X-22-1619, X-22-2404, X-22-2474, X-22-174DX, X-22-8201, X-22-2426, X-22-164A, and X-22-164C (trade names, manufactured by Shin-Etsu Chemical Co., Ltd).

Other resin components may be added to the coating agent. Examples include thermoplastic resins and rubbers.

By adding a thermoplastic resin or rubber as an additional resin, the original properties (mechanical properties, surface and interfacial properties, compatibility, etc.) of the resin can be modified.

The thermoplastic resin includes, for example, the following compounds.

Polyethylene, polypropylene, polyvinyl chloride, polyvinylidene chloride, polystyrene, acrylonitrile-styrene resins, acrylonitrile-butadiene-styrene resins, poly(meth)acrylate resins, ultrahigh molecular weight polyethylene, poly-4-methylpentene, syndiotactic polystyrene, polyacetal, polycarbonate, polyphenylene ether, polyphenylene sulfide, polysulfone, poly(ether sulfone), polyether ether ketone, aromatic polyesters (U polymer, trade name of Unitica Co., Ltd.; and Vectra, trade name of Polyplastics Co., Ltd.), polyimides (Kapton: trade name of Toray Inc., and AURUM: trade of Mitsui Chemicals Co., Ltd., etc.), polyetherimides, and polyamideimides.

Polyamides such as nylon 6, nylon 6,6, nylon 6,10, nylon MXD6, and nylon 6,T (trade names, manufactured by DuPont).

Polyesters such as polyethylene terephthalate, polybutylene terephthalate and polyethylene 2,6-naphthalene dicarboxylate.

Further, fluorine resins such as polytetrafluoroethylene and polyvinylidene fluoride.

The curable resin used in the surface layer 12 is used in the form of a coating agent for being applied onto the substrate film. Therefore, the coating agent is preferably in the form of a liquid. In the case where the curable resin is a solid, it may be used in the form of a coating agent by dissolving it in a solvent as described above.

The concentration of the curable resin in the coating agent can be selected in such a manner that the viscosity of the coating agent corresponds to the viscosity required by the coating method such as the wet coating method. The concentration is preferably from 1 to 80 wt %, and more preferably from 3 to 60 wt %. The concentration of the curable resin in the coating agent can be adjusted with a solvent. As for the solvent, for example, a common organic solvent such as methyl ethyl ketone and methyl isobutyl ketone may be used. In addition, when the fluorine compound contained in the curable resin composition has a decreased solubility in the solvent due to the length of the fluoroalkyl group contained in the fluorine compound, a fluorinated organic solvent may be used. In the coating agent, other generally known additives, for example a leveling agent such as a surfactant, may be additionally added as necessary. When the leveling agent is added, the surface tension of the coating agent can be controlled to suppress the surface defects such as shrinkage and crater generated during the formation of the layer.

Examples of the treatments for curing the curable resin include UV irradiation, heating, electron beam irradiation, and others. Moreover, when a solvent is contained in the coated film, it is generally preferable to heat the coated film for several tens of minutes at a temperature in the range of 70 to 200° C. to remove the solvent remaining in the coated film, followed by curing. When cured by UV irradiation, the coating solution is irradiated for a short period of time (several seconds to several tens of seconds) by using an ultraviolet (UV) lamp (for example, a high-pressure mercury lamp, an ultrahigh-pressure mercury lamp, a metal halide lamp or a high-power metal halide lamp) at a wavelength of 200 to 400 nm. Furthermore, when cured by heating, for example, the coating solution is heated generally at a temperature of 180 to 250° C., and preferably 200 to 250° C. In this case, it is sufficient to heat for 30 to 90 minutes when an oven is used, and 5 minutes to 30 minutes when a hot plate is used. Moreover, when cured by electron beam irradiation, the coating solution is irradiated with a low energy electron beam by using a self-shielding low energy electron accelerator at 300 keV or less.

The surface layer 12 is formed integrally by a part of the base film 11 with the curable resin composition. The concentration of the curable resin composition gradually decreases toward the interior of the base film 11, so that there is no distinct boundary between the portions of the base film 11 that are mixed with/without the curable resin composition. Therefore, as an example, the curable resin composition (active ingredient) is preferably 0.5 to 20 g/m², and more preferably 1.0 to 10 g/m², with respect to the coated amount of the surface layer 12.

The surface layer 12 contains a fluorine compound, and further a curable resin. The fluorine compound has the property of easy aggregation at the interface between the air and the solid in a hydrophobic environment (e.g., in the air). The reason may be that the fluorine compound having a fluoro group is attracted to the air side since it has a higher hydrophobicity than the resin. Therefore, during the coating process, the fluorine compound aggregates in the vicinity of the surface of the surface layer 12, and the concentration of the fluorine compound is shifted to the surface side. As a result, a slant concentration profile of the fluorine compound is formed in the vicinity of the surface of the surface layer 12.

In addition, as an antifouling material, the fluorine compound has excellent properties, thus improving the antifouling property of the surface layer 12.

Fluorosilsesquioxane

The silsesquioxane contained in the curable resin composition refers to a polysiloxane represented by $[(R-SiO_{1.5})n]$ (where R is an arbitrary substituent). The structure of the silsesquioxane generally includes a random structure, a ladder structure, and a cage structure in accordance with the structure of the Si—O—Si skeleton. Further, the cage structure is classified into types T8, T10, and T12 based on the number of Si contained.

The fluorosilsesquioxane used in the laminate of this application needs to have a property of easy aggregation at the interface between the air and the solid in a hydrophobic environment (for example, in the air). The effect of the present invention can be sufficiently obtained as long as the fluorosilsesquioxane aggregates at the interface.

By virtue of this excellent surface aggregation behavior of the fluorosilsesquioxane, the surface of the surface layer 12 can be modified slightly and efficiently.

As an example, a fluorosilsesquioxane having a structure shown by Formula (I) below is preferred.

[Chemical Formula 3]

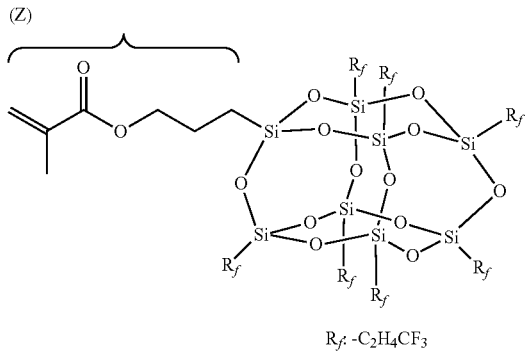

(I)

That is, among the random structure, the ladder structure, and the cage structure of the silsesquioxane, the cage structure is particularly preferred. If the fluorosilsesquioxane having a cage structure is used, the aggregation rate at the interface is much higher than that of the fluorosilsesquioxanes having other structures.

Considering the availability, any one of the types T8, T10 and T12 is preferred.

The substituent (R) in the Formula $[(R-SiO_{1.5})n]$ is preferably a fluoroalkyl group ($R_f$). Considering the solubility in a solvent, $R_f$ preferably has 1 to 8 carbon atoms. $R_f$ may be a linear or branched group. Specific examples of the linear group include: $-CH_2CH_2CF_3$, $-CH_2CH_2CF_2CF_3$, $-CH_2CH_2CF_2CF_2CF_3$, $-CH_2CH_2CF_2CF_2CF_2CF_3$, $-CH_2CH_2CF_2CF_2CF_2CF_2CF_3$, and $-CH_2CH_2CF_2CF_2CF_2CF_2CF_2CF_3$, and examples of the branched group include $-CH_2CH_2CF(CF_3)_2$, $-CH_2CH(CF_3)CF_2CF_3$, $-CH(CF_3)CH_2CF_2CF_3$, $-CH_2C(CF_3)_2CF_3$, $-C(CF_3)_2CH_2CF_3$, $-CH_2CH_2CF_2CF(CF_3)_2$, $-CH_2CH_2CF(CF_3)CF_2CF_3$, and $-CH_2CH_2C(CF_3)_2CF_3$. Furthermore, $R_f$ may be different or the same.

Among the fluorosilsesquioxanes of Formula (I), examples include, but are not limited to, a fluorosilsesquioxane having a "3-(methacryloyloxy)propyl group" on one Si atom. For example, when the "3-(methacryloyloxy) propyl group" is located at Z, the position may be substituted with another functional group. In particular, Z may be any one of the following groups: hydrogen, hydroxy, alkenyl, or halo (chloro, bromo, and iodo), alkoxy, phenoxy, polyoxyalkylene, —COOH, 2-oxapropane-1,3-dioyl, alkoxycarbonyl, alkenyloxycarbonyl, oxacyclopropyl, 3,4-epoxycyclohexyl, oxetanyl, oxetanylene, —NH—, —NH₂, —CN, —NCO, alkynyl, cycloalkenyl, acryloyloxy, methacryloyloxy, urethane-acryloyl, urethane-methacryloyl, —SH and —PH₂. Further, Z may also be the above groups (hydrogen to —PH₂) intervened by an alkylene group between it and Si. The alkylene bonded to Si is not particularly limited, and is preferably an alkylene group having 1 to 8 carbon atoms, and more preferably propylene having 3 carbon atoms. Among them, the group having an alkylacyloxy radical, the group having a halogenated sulfonyl radical, and the group having an α-halogenoester radical are excluded.

Fluorosilsesquioxane Polymers

Where the curable resin composition contains a polymer of fluorosilsesquioxane having a functional group that is polymerizable, the polymer may be a polymer of fluorosilsesquioxane alone, a copolymer with other common monomers (e.g., an addition polymerizable monomer), or a copolymer of fluorosilsesquioxanes having different polymerizable groups. In this case, any known method may be used for the polymerization. As such, the fluorosilsesquioxane used in the laminate of the present application may be a fluorosilsesquioxane polymer.

That is, the fluorosilsesquioxane of Formula (I) may also has an addition polymerizable functional group as Z, or has an addition polymerizable functional group as Z with an alkylene group intervened between it and Si. Examples of the addition polymerizable functional group include a terminally olefinic or an internally olefinic group having a radical polymerizable functionality; a group having a cationically polymerizable functionality such as vinyl ether or propenyl ether; and a group having an anionically polymerizable functionality such as vinylcarboxy, and cyanoacryloyl, and preferably a radical polymerizable functional group.

The radical polymerizable functional group is not particularly limited as long as it is a radical polymerizable group, and includes, for example, methacryloyl, acryloyl, allyl, styryl, α-methylstyryl, vinyl, vinyl ether group, vinyl ester group, acrylamide group, methacrylamide group, N-vinyl amide group, maleate group, fumarate group, and N-substituted maleimide group, and preferably a radical having a (meth)acrylate group or a styryl group. The (meth)acrylate group as used herein refers to a generic term of an acrylate group and a methacrylate group. The same applies hereinafter.

Examples of the radical polymerizable functional group having a (meth)acrylate group include a group represented by Formula (II) below. In Formula (II), $Y^1$ represents an alkylene group having 2 to 10 carbon atoms, preferably an alkylene group having 2 to 6 carbon atoms, and more preferably propyl. X represents hydrogen or an alkyl group having 1 to 3 carbon atoms, and preferably hydrogen or methyl.

In addition, examples of the radical polymerizable functional group having styryl include a group represented by Formula (III) below. In Formula (III), $Y^2$ represents a single bond or an alkylene group having 1 to 10 carbon atoms, preferably a single bond or an alkylene group having 1 to 6 carbon atoms, and more preferably a single bond or ethylene. Further, the vinyl is bonded to any one of the carbon atones on the phenyl ring, and preferably to the para-carbon with respect to $Y^2$.

clohexylmethyl (meth)acrylate; a (meth)acrylate containing an oxetanyl group, such as 3-ethyl-3-(meth)acryloyloxymethyloxetane; 2-(meth)acryloyloxyethyl isocyanate; γ-(methacryloyloxypropyl)trimethoxysilicane; 2-aminoethyl (meth)acrylate, 2-(2-bromopropionyloxy)ethyl (meth)acrylate, 2-(2-bromoisobutyryloxy)ethyl (meth)acrylate; 1-(meth)acryloyloxy-2-phenyl-2-(2,2,6,6-tetramethyl-1-piperidinyloxy)ethane, 1-(4-((4-(meth)acryloyloxy)ethoxyethyl)phenylethoxy)piperidine, 1,2,2,6,6-pentamethyl-4-piperidine (meth)acrylate, 2,2,6,6-pentamethyl-4-piperidine (meth)acrylate.

Examples of the styryl compound having an addition polymerizable double bond include a styryl compound having a crosslinkable functional group, and specific examples of the crosslinkable functional group include epoxy groups such as a glycidyl group, oxetanyl, halo, amino, isocyanate group, anhydride group, carboxy, hydroxy, thiol group, and silyloxy.

Examples of the styryl compound having a crosslinkable functional group include o-aminostyrene, p-styrene chlorosulfonic acid, styrenesulfonic acid and a salt thereof, vinyl phenylmethyldithiocarbamate, 2-(2-bromopropionyloxy)styrene, 2-(2-bromoisobutyryloxy)styrene, 1-(2-((4-vinylphenyl)methoxy)-1-phenylethoxy)-2,2,6,6-tetramethylpiperidine or a compound represented by a formula below.

[Chemical Formula 4]

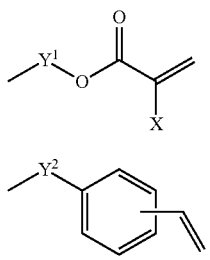

(II)

(III)

The addition polymerizable monomer includes a monomer having a crosslinkable functional group and a monomer having no crosslinkable functional group. The addition polymerizable monomer having a crosslinkable functional group may be a compound having one or two or more addition polymerizable double bonds, and may be, for example, a vinyl compound, a vinylidene compound, and a vinylene compound, and more specifically a (meth)acrylic compound or a styryl compound, and the like.

Examples of the (meth)acrylate compound include, in addition to (meth)acrylic acid and (meth)acrylate, (meth)acrylamide, (meth) acrylonitrile and the like.

Examples of the (meth)acrylate compound as the addition polymerizable monomer include a (meth)acrylate having a crosslinkable functional group. Examples of the crosslinkable functional group include epoxy groups such as glycidyl and epoxycyclohexyl, oxetanyl, isocyanate group, anhydrides group, carboxyl and hydroxyl, and preferably epoxy groups such as glycidyl or oxetanyl. Specific examples of the (meth)acrylates having a crosslinkable functional group include (meth)acrylic acid; a hydroxyalkyl (meth)acrylate such as 2-hydroxyethyl (meth)acrylate, and 2-hydroxypropyl (meth)acrylate; a (meth)acrylate containing an epoxy group, such as glycidyl (meth)acrylate; a (meth)acrylate containing an alicyclic epoxy group such as 3,4-epoxycy-

[Chemical Formula 5]

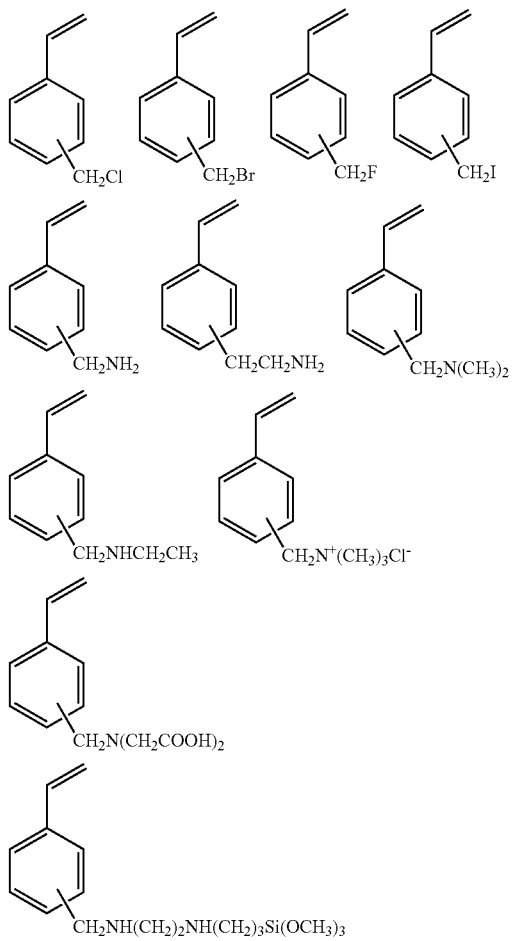

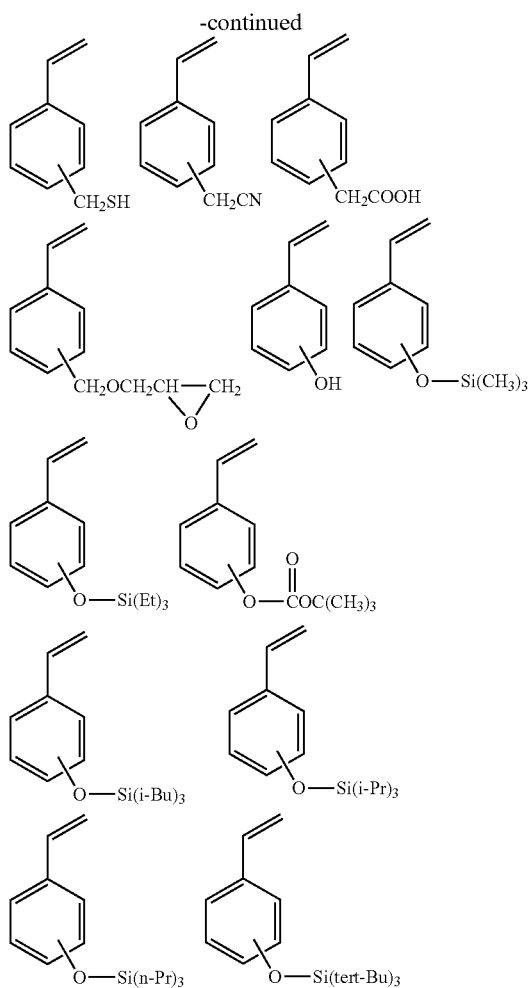

In addition to the addition polymerizable monomer, in order to control the compatibility with the curable resin, the leveling property, and the amount of crosslinkable functional groups in the copolymer etc, other addition polymerizable monomers than the said addition polymerizable monomer may be optionally used in combination.

Examples of the addition polymerizable monomer having no crosslinkable functional group include a (meth)acrylate compound having an addition polymerizable double bond and having no crosslinkable functional group and a styryl compound having an addition polymerizable double bond, and having no crosslinkable functional group. Specific examples of the (meth)acrylate compound include: an alkyl (meth)acrylate such as methyl (meth)acrylate, ethyl (meth)acrylate, n-propyl (meth)acrylate, isopropyl (meth)acrylate, butyl (meth)acrylate, isobutyl (meth)acrylate, t-butyl (meth)acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, and stearyl (meth)acrylate; an aryl (meth)acrylate such as phenyl (meth)acrylate, and tolyl (meth)acrylate; an arylalkyl (meth)acrylate such as benzyl (meth)acrylate; an alkoxyalkyl (meth)acrylate such as 2-methoxyethyl (meth)acrylate, 3-methoxypropyl (meth)acrylate, 3-methoxybutyl (meth)acrylate; and an ethylene oxide adduct of (meth)acrylic acid. Specific examples of the (meth)acrylate compound having an addition polymerizable double bond and no crosslinkable functional group further include a fluoroalkyl (meth)acrylate such as trifluoromethylmethyl (meth)acrylate, 2-trifluoromethylethyl (meth)acrylate, 2-perfluoroethylethyl (meth)acrylate, 2-perfluoroethyl-2-perfluorobutylethyl (meth)acrylate, perfluoroethyl (meth)acrylate, trifluoromethyl (meth)acrylate, bis(perfluoromethyl)methyl (meth)acrylate, 2-perfluoromethyl-2-perfluoroethylethyl (meth)acrylate, 2-perfluorohexylethyl (meth)acrylate, 2-perfluorodecylethy (meth)acrylate, and 2-perfluorohexadecylethyl (meth)acrylate.

Further, examples of the (meth)acrylate compound having an addition polymerizable double bond and no crosslinkable functional group include a (meth)acrylate compound having a silsesquioxane skeleton. Specific examples of the (meth)acrylate compound having a silsesquioxane skeleton include 3-(3,5,7,9,11,13,15-pentaethylpentacyclo[9.5.1.1$^{3,9}$.1$^{5,15}$.1$^{7,13}$]octasiloxane-1-yl) propyl (meth)acrylate, 3-(3,5,7,9,11,13,15-pentaisobutyl-pentacyclo[9.5.1.1$^{3,9}$.1$^{5,15}$.1$^{7,13}$]octasiloxane-1-yl)propyl (meth)acrylate, 3-(3,5,7,9,11,13,15-pentaisooctyl pentacyclo[9.5.1.1$^{3,9}$.1$^{5,15}$.1$^{7,13}$]octasiloxane-1-yl)propyl (meth)acrylate, 3-(3,5,7,9,11,13,15-heptacyclopentylpentacyclo[9.5.1.1$^{3,9}$.1$^{5,15}$.1$^{7,13}$]octasiloxane-1-yl) propyl (meth)acrylate, 3-(3,5,7,9,11,13,15-pentaphenylpentacyclo[9.5.1.1$^{3,9}$.1$^{5,15}$.1$^{7,13}$]octasiloxane-1-yl)propyl (meth)acrylate, 3-[(3,5,7,9,11,13,15-pentaethylpentacyclo [9.5.1.1$^{3,9}$.1$^{5,15}$.1$^{7,13}$]octasiloxane-1-oxy)dimethylsilyl]propyl (meth)acrylate, 3-[(3,5,7,9,11,13,15-pentaisobutylpentacyclo[9.5.1.1$^{3,9}$.1$^{5,15}$.1$^{7,13}$]octasiloxane-1-oxy) dimethylsilyl]propyl (meth)acrylate, 3-[(3,5,7,9,11,13,15-pentaisooctylpentacyclo [9.5.1.1$^{3,9}$.1$^{5,15}$.1$^{7,13}$]octasiloxane-1-oxy)dimethylsilyl]propyl (meth)acrylate, 3-[(3,5,7,9,11,13,15-heptacyclopentylpentacyclo [9.5.1.1$^{3,9}$.1$^{5,15}$.1$^{7,13}$]octasiloxane-1-oxy)dimethylsilyl]propyl (meth)acrylate, 3-[(3,5,7,9,11,13,15-pentaphenylpentacyclo [9.5.1.1$^{3,9}$.1$^{5,15}$.1$^{7,13}$]octasiloxane-1-oxy)dimethylsilyl]propyl (meth)acrylate, and the like. Specific examples of the styryl compound having an addition polymerizable double bond and having no crosslinkable functional group include styrene, vinyltoluene, α-methylstyrene, p-chlorostyrene and the like.

Examples of the styryl compound having an addition polymerizable double bond and no crosslinkable functional group further include a styryl compound containing a silsesquioxane. The silsesquioxane-containing styrene derivative includes: octasiloxane having an 4-vinylphenyl group (T8 silsesquioxane), such as 1-(4-vinylphenyl)-3,5,7,9,11,13,15-pentaethylpentacyclo[9.5.1.1$^{3,9}$.1$^{5,15}$.1$^{7,13}$]octasiloxane, 1-(4-vinylphenyl)-3,5,7,9,11,13,15-pentaisobutylpentacyclo [9.5.1.1$^{3,9}$.1$^{5,15}$.1$^{7,13}$]octasiloxane, 1-(4-vinylphenyl)-3,5,7,9,11,13,15-pentaisooctyl pentacyclo [9.5.1.1$^{3,9}$.1$^{5,15}$.1$^{7,13}$]octasiloxane, 1-(4-vinylphenyl)-3,5,7,9,11,13,15-heptacyclopentylpentacyclo[9.5.1.1$^{3,9}$.1$^{5,15}$.1$^{7,13}$]octasiloxane, and 1-(4-vinylphenyl)-3,5,7,9,11,13,15-pentaphenylpentacyclo[9.5.1.1$^{3,9}$.1$^{5,15}$.1$^{7,13}$]octasiloxane; and octasiloxane having a 4-vinylphenylethyl group (T8 silsesquioxane), such as 3-(3,5,7,9,11,13,15-pentaethylpentacyclo[9.5.1.1$^{3,9}$.1$^{5,15}$.1$^{7,13}$]octasiloxane-1-yl) ethylstyrene, 3-(3,5,7,9,11,13,15-pentaisobutylpentacyclo[9.5.1.1$^{3,9}$.1$^{5,15}$.1$^{7,13}$]octasiloxane-1-yl)ethylstyrene, 3-(3,5,7,9,11,13,15-pentaisooctylpentacyclo [9.5.1.1$^{3,9}$.1$^{5,15}$.1$^{7,13}$]octasiloxane-1-yl)ethylstyrene, 3-(3,5,7,9,11,13,15-heptacyclopentylpentacyclo[9.5.1.1$^{3,9}$.1$^{5,15}$.1$^{7,13}$]octasiloxane-1-yl) ethylstyrene, 3-(3,5,7,9,11,13,15-pentaphenylpentacyclo [9.5.1.1$^{3,9}$.1$^{5,15}$.1$^{7,13}$]octasiloxane-1-yl) ethylstyrene, 3-((3,5,7,9,11,13,15-pentaethylpentacyclo[9.5.1.1$^{3,9}$.1$^{5,15}$.1$^{7,13}$]octasiloxane-1-oxy)dimethylsilyl)ethylstyrene, 3-((3,5,7,9,11,13,15-pentaisobutyl pentacyclo[9.5.1.1$^{3,9}$.1$^{5,15}$.1$^{7,13}$]

octasiloxane-1-oxy)dimethylsilyl)ethylstyrene, 3-((3,5,7,9, 11,13,15-pentaisooctylpentacyclo[9.5.1.1$^{3,9}$.1$^{5,15}$.1$^{7,13}$]octasiloxane-1-oxy) dimethylsilyl)ethylstyrene, 3-((3,5,7,9,11, 13,15-heptacyclopentylpentacyclo [9.5.1.1$^{3,9}$.1$^{5,15}$.1$^{7,13}$] octasiloxane-1-oxy)dimethylsilyl)ethylstyrene, and 3-((3,5, 7,9,11,13,15-pentaphenylpentacyclo[9.5.1.1$^{3,9}$.1$^{5,15}$.1$^{7,13}$] octasiloxane-1-oxy) dimethylsilyl)ethylstyrene.

Examples of other addition polymerizable monomers than the said addition polymerizable monomer further include a macromonomer having a skeleton derived from styrene, (meth)acrylates, siloxane and alkylene oxides such as ethylene oxide and propylene oxide, and having a polymerizable double bond.

Examples of the addition polymerizable monomer also include a compound having two addition polymerizable double bonds. Examples of the compound having two addition polymerizable double bonds include di(meth)acrylate monomers such as 1,3-butylene glycol di(meth)acrylate, 1,4-butylene glycol di(meth)acrylate, 1,6-hexylene glycol di(meth)acrylate, polyethylene glycol di(meth)acrylate, diethylene glycol di(meth)acrylate, neopentyl glycol di(meth)acrylate, triethylene glycol di(meth)acrylate, tripropylene glycol di(meth)acrylate, neopentyl glycol hydroxytrimethyl acetate di(meth)acrylate, trimethylolpropane di(meth)acrylate, bis[(meth)acryloyloxyethoxy]bisphenol A, bis[(meth)acryloyloxyethoxy]tetrabromo bisphenol A, bis[(meth)acryloyloxypolyethoxy]bisphenol A, 1,3-bis(hydroxyethyl)5,5-dimethylglycolylurea, 3-methylpentanediol di(meth)acrylate, neopentyl glycol hydroxytrimethyl acetate di(meth)acrylate and bis[(meth)acryloyloxypropyl]tetramethyldisilicane, and divinylbenzene.

Examples further include a macromonomer having a skeleton derived from styrene, (meth)acrylates, siloxane and alkylene oxides such as ethylene oxide and propylene oxide, and having two polymerizable double bonds.

Examples of the addition polymerizable monomer also include a compound having three or more addition polymerizable double bonds. Examples of the compound having three or more addition polymerizable double bonds include trimethylolpropane tri(meth)acrylate, pentaerythritol tri(meth)acrylate, pentaerythritol tetra(meth)acrylate, dipentaerythritol monohydroxypenta(meth)acrylate, tris(2-hydroxyethyl isocyanate) tri(meth)acrylate, tris(diethylene glycol) trimellitate tri(meth)acrylate, 3,7,14-tris[(((meth) acryloyloxypropyl)dimethylsilyloxy)]-1,3,5,7,9,11,14-pentaethyl tricylco[7.3.3.1$^{5,11}$]heptasiloxane, 3,7,14-tris [(((meth)acryloyloxypropyl) dimethylsilyloxy)]-1,3,5,7,9, 11,14-pentaisobutyltricylco[7.3.3.1$^{5,11}$]heptasiloxane, 3,7, 14-tris[(((meth)acryloyloxypropyl)dimethylsilyloxy)]-1,3, 5,7,9,11,14-pentaisooctyl tricylco[7.3.3.1$^{5,11}$]heptasiloxane, 3,7,14-tris[(((meth)acryloyloxypropyl) dimethylsilyloxy)]-1,3,5,7,9,11,14-heptacyclopentyltricylco[7.3.3.1$^{5,11}$]heptasiloxane, 3,7,14-tris[(((meth)acryloyloxypropyl)dimethylsilyloxy)]-1,3,5,7,9,11,14-pentaphenyl tricylco[7.3.3.1$^{5,11}$] heptasiloxane, octakis(3-(meth) acryloyloxypropyldimethylsilyloxy) octasilsesquioxane, and octakis(3-(meth)acryloyloxypropyl)octasilsesquioxane.

Examples further include a macromonomer having a skeleton derived from styrene, (meth)acrylates, siloxane and alkylene oxides such as ethylene oxide and propylene oxide, and having three or more polymerizable double bonds.

The addition polymerizable monomer is preferably a (meth)acrylate compound, more preferably a (meth)acrylate ester, and further preferably a lower alkyl (having 1-3 carbon atoms) (meth)acrylate, or an ester having a crosslinkable functional group.

The polymer is an addition polymer of fluorosilsesquioxane or an addition copolymer with other addition polymerizable monomers. In the case of a copolymer, it may be an ordered copolymer such as a block copolymer, or a random copolymer, and preferably a random copolymer. In addition, the polymer may further have a crosslinked structure, or be a graft copolymer.

[Adhesive Layer 13/Peelable Film 14]

As shown in FIG. 1, the adhesive layer 13 is formed by coating an adhesive on the back surface side of the substrate film 11 which has been/is to be subjected to antifouling treatment by the surface layer 12. The adhesive layer 13 may be directly formed on the surface of the substrate film 11 or may be laminated with another layer intervened therebetween.

The adhesive for the adhesive layer 13 may be an acrylic adhesive, a rubber adhesive, an urethane adhesive, or a silicone adhesive. From the viewpoint of product design, acrylic adhesives having excellent heat resistance and weatherability are preferred in applications where long-term durability is required.

In the adhesive layer 13 of the present application, irregularities are provided on the surface of the adhesive in terms of the property of adhesion to the article to be adhered.

Examples of the acrylic adhesive include an acrylic adhesive containing an acrylic copolymer obtained by copolymerizing a monomer having a functional group such as carboxyl or hydroxyl with a monomer mainly composed of an acrylate.

Examples of the acrylate include methyl (meth)acrylate, ethyl (meth)acrylate, n-propyl (meth)acrylate, isopropyl (meth)acrylate, n-butyl (meth)acrylate, isobutyl (meth)acrylate, s-butyl (meth)acrylate, t-butyl (meth)acrylate, pentyl (meth)acrylate, isopentyl (meth)acrylate, hexyl (meth)acrylate, cyclohexyl (meth)acrylate, heptyl (meth)acrylate, n-octyl (meth)acrylate, isooctyl (meth)acrylate, 2-ethylhexyl (meth)acrylate, nonyl (meth)acrylate, isononyl (meth)acrylate, decyl (meth)acrylate, isodecyl (meth)acrylate, undecyl (meth)acrylate, dodecyl (meth)acrylate, tridecyl (meth)acrylate, tetradecyl (meth)acrylate, pentadecyl (meth)acrylate, hexadecyl (meth)acrylate, heptadecyl (meth)acrylate, octadecyl (meth)acrylate, nonadecyl (meth)acrylate, eicosyl (meth)acrylate, isobornyl (meth)acrylate, and adamantly (meth)acrylate. These alkyl (meth)acrylates may be used alone or in combination of two or more thereof.

The following monomers may be copolymerized with the alkyl (meth)acrylate. Examples of the copolymerizable monomers include monomers containing a carboxy group such as itaconic acid, maleic acid, butenoic acid, isobutenoic acid, fumaric acid, (meth)acrylic acid, carboxyethyl (meth) acrylate, and carboxypentyl (meth)acrylate; monomers containing a hydroxyl group, such as 2-hydroxyethyl (meth) acrylate, 3-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxylauryl (meth)acrylate, and (4-hydroxymethylcyclohexyl) methacrylate; monomers containing a glycidyl group, such as glycidyl (meth)acrylate and methylglycidyl (meth)acrylate; cyanoacrylate monomers such as acrylonitrile and methacrylonitrile; nitrogen containing monomers, such as N,N-dimethylaminoethyl (meth)acrylate N,N-dimethylaminopropyl(meth)acrylamide, N,N-dimethyl(meth) acrylamide, N,N-diethyl(meth)acrylamide, N-isopropyl (meth)acrylamide, N-hydroxyethyl(meth)acrylamide, (meth)acryloylmorpholine, N-vinyl-2-piperidinone, N-vinyl-3-morpholinone, N-vinyl-2-caprolactam, N-vinyl-2-pyrrolidone, N-vinyl-1,3-dioxazine-2-one, N-vinyl-3,5- morpholindione, N-cyclohexylmaleimide, N-phenylmaleimide, N-acryloylpyrrolidine, t-butylaminoethyl (meth)acylate; styrene or a derivative thereof, vinyl acetate, and so on. One or two or more of these monomers may be copolymerized with a (meth)acrylate, if necessary.

For example, the adhesive used in the present invention preferably contains at least one selected from the group consisting of butyl acrylate and 2-ethylhexyl acrylate, and at least a carboxyl group-containing monomer selected from the group consisting of acrylic acid and methacrylic acid.

In order to improve the heat resistance and weatherability, the adhesive used in the present invention is, for example, added with a hard component such as methyl acrylate and vinyl acetate, to increase the glass transition temperature (Tg). Examples of the hard component for adjusting the glass transition temperature include methyl acrylate, vinyl acetate, methyl methacrylate and acrylonitrile.

Further, in order to further improve various physical properties such as weatherability, an UV absorber, a light stabilizer and the like may be added as necessary.

The content of the hard component is preferably 10 to 80 wt %, preferably 20 to 70 wt %, and more preferably 30 to 60 wt %, based on the total amount of the adhesive.

The weight average molecular weight (Mw) of the acrylic copolymer is 50,000 to 2,000,000, preferably 100,000 to 1,500,000, and more preferably 150,000 to 1,000,000.

The number-average molecular weight (Mn) is 10,000 to 500,000, preferably 10,000 to 400,000, and more preferably 10,000 to 300,000.

The polydispersity is from 1 to 20, preferably from 1 to 15, and more preferably from 2 to 10.

The glass transition temperature is −70 to 0° C., preferably −40 to 0° C., more preferably −30 to 0° C., and particularly preferably −20 to 0° C.

The composition for forming the adhesive layer 13 is coated onto the peelable film 14 or the substrate film 11 generally by, for example, gravure coating, rod coating, spray coating, spin coating, roll coating, die coating method, blade coating, air knife coating, hot melt coating, and curtain coating.

The adhesive layer 13 has a thickness of 10 to 100 m, preferably 15 to 50 m, and more preferably 25 to 45 μm in terms of the adhesiveness after the attachment.

For the adhesive layer 13, the irregularities are transferred by attaching to the peelable film 14 formed with irregularities, so as to physically form the surface irregularities. The surface irregularities of the adhesive layer 13 having good adhesion property are expressed as an arithmetic mean roughness R(a), which is 300 to 800 nm, preferably 350 to 750 nm, and more preferably 400 to 700 nm.

The peelable film 14 may be, for example, a plastic film such as a polyester resin and a polyolefin resin, and caulked paper such as cellophane and glassine paper. Further, it is possible to use a resin film of polyethylene terephthalate, polyethylene, and polypropylene, which is coated with a fluorine resin, a silicone resin, an carbamate containing a long-chain alkyl group, and other peeling agent on a single or both surfaces.

The thickness of the peelable film varies depending on the materials used, and is usually 10 to 250 μm, and preferably 20 to 200 m.

TABLE 1

| Evaluation of peeling agent | | |
|---|---|---|
| Peeling agent | Processability | Peelability |
| Fluorine resin | Δ | ○ |
| Silicone resin | ○ | ○ |
| Carbamate containing a long-chain alkyl group | ○ | Δ |

○ excellent,
Δ good

The surface irregularities formed on the peelable film 14 are expressed as an arithmetic mean roughness R(a), which is 350 to 850 nm, preferably 400 to 800 nm, and more preferably 450 to 750 nm. As the method of forming the irregularities, a generally known method may be used.

Moreover, the arithmetic mean roughness R(a) is defined as a value obtained by extracting only a reference length (the lower-case L in the following formula) from a roughness profile in the direction of a mean line of the roughness profile, adding up the absolute values of the deviations from the extracted mean line to the profile measured and averaging. The calculation method is preferred because the influence of a defect on the measured value becomes very small and thus a stable result can be obtained.

$$Ra = \frac{1}{l}\int_0^l |f(x)|dx \qquad \text{[Math Formula 1]}$$

After being peeled off from a defined peelable film, the adhesive layer of the present invention formulated as defined above can retain the shape and size of the irregularities within a short period of time (10 to 120 minutes, preferably 20 to 90 minutes, and particularly preferably 30 to 60 minutes after peeling). Thereafter, the adhesive layer is attached to an article to be adhered, upon which the irregularities trend to disappear under the action of the pressure applied, and thus the laminate is evenly attached following the contour of the adhered article. The attachment is further characterized in that when a peelable film having no the surface roughness as described above, or an adhesive layer deviating from the defined formulation is used, the irregularities are destroyed prematurely, or the hardness becomes too high, which causes loss in uniformity when the laminate is attached to the article to be adhered and interferes with the removal of air or water bubbles.

For the protection film having the adhesive layer of the present invention, when attached, adjacent non-adhered depressed portions of the adhesive layer are successively used while the bubbles are removed rapidly, such that the adhesive surface removed of bubbles is sequentially adhered to and integrated with the article to be adhered.

Moreover, when such an attachment method is employed, gradual spread of bubbles seldom occurs even in use for a long period of time after the completion of the attachment, and the local physical defects or air (oxygen) containing chemical defects resulting from the bubbles between the adhered article practically using the protection film and the adhesive layer are not caused to be spread, either. When used for a long period of time, the initial mechanical properties (disintegration and impact resistance), the initial heat resistance, the initial weatherability and thus the initial peelability (no glue residue) are maintained. A new and epochal attachment method is found. In addition, tendency to poor long-time maintenance of initial properties are observed for formulations requiring for a long time with respect to the adhesion property.

The laminate of the present application has a high water repellency and antifouling property by virtue of the surface layer, and has high property of adhesion to the adhered article such as a vehicle body by virtue of the adhesive layer. By the surface layer, the surface is smoothed, and the reflectivity is suppressed, thereby providing a glossy feeling. Further, the curable resin penetrates into the interior of the thermoplastic polyurethane and forms a surface layer integrated with a part of the substrate film. Therefore, the elongation at break is high, and the laminate can be easily attached even when the article to be adhered has a surface with a complicated shape, such as a curved surface. Further, by controlling the surface roughness of the adhesive surface, the property of adhesion to the adhered article (removal of water and air bubbles) can be remarkably improved. Moreover, since the adhesive layer is excellent in heat resistance and weatherability, there is no glue residue after peeling. In addition, the adhesive surface of the adhesive layer is protected by the peelable film having a high peelability until it is attached to an article to be adhered, so the laminate can be circulated and transported without deteriorating the adhesiveness.

[Surface Protected Articles]

The surface protected article provided in a second implementation of the present invention is described. Articles to be adhered with the laminate of the present application include, for example, automotive vehicles, airplanes, and ships and boats. The laminate is effective in the protection of various body portions of these articles, in particular the coating on the vehicle bodies (for example, the top of the front hood and the other top surface, and rocker panel) exposed to the risk of flying debris (e.g., sand, and stone) and insects, etc.

Further, the present invention is, for example, applicable to a wide range of areas including windows, construction materials, digital signage, packages, and office supplies, and is applicable to electronics, safe guards, and industries. Moreover, the present invention is also useful in the packaging of wastes or the protection of the surface of medical devices in the fields of health caring and medical treatment.

EXAMPLES

Property evaluation results of the laminate are shown below.

Production Example 1: Synthesis of Polymer A-1

To a four-neck round bottom flask equipped with a reflux condenser and a dropping funnel and sealed with nitrogen, a compound A (25 g), Silaplane FM0721 (6.25 g, manufactured by JNC Co., Ltd), 2-hydroxyethyl methacrylate (18.75 g), methyl methacrylate (12.5 g), and methyl ethyl ketone (61.97 g) are added, and refluxed for 15 min in an oil bath to remove the dissolved gases. Then a solution of azobisisobutyronitrile (0.477 g) and mercaptoacetic acid (0.054 g) dissolved in methyl ethyl ketone (4.78 g) is added, and polymerization is started. After 3 hr polymerization, azobisisobutyronitrile (0.477 g) dissolved in methyl ethyl ketone (4.29 g) is added, and a copolymer solution is obtained after aging for 5 hrs. Further, the polymerization inhibitors p-methoxyphenol (0.16 g), and dibutyltin dilaurate (0.154 g, manufactured by Showa Denko Co., Ltd.) dissolved in methyl ethyl ketone (1.54 g) are added, and Karenz AOI (26.43 g) is added dropwise via the dropping funnel in a manner such that the temperature of the liquid is changed from 35 to 50° C., and then aged for 3 hrs at 45° C. after addition.

Subsequently, methanol (9 g) is added for treatment, and p-methoxyphenol (0.16 g) is further added and diluted with methyl isobutyl ketone (107.34 g), to obtain a 30 wt % solution of the target polymer A-1.

The resultant polymer A-1 has a weight average molecular weight Mw of 42,000 and a polydispersity Mw/Mn of 1.9, where the weight average molecular weight and the polydispersity are determined by Gel Permeation Chromatography (GPC; Model: Alliance 2695, manufactured by Waters Corporation; Column: Shodex GPC KF-804L×2 (in tandem), Guard column: KF-G).

The compound A has a molecular structure represented by Formula (IV) below.

[Chemical Formula 6]

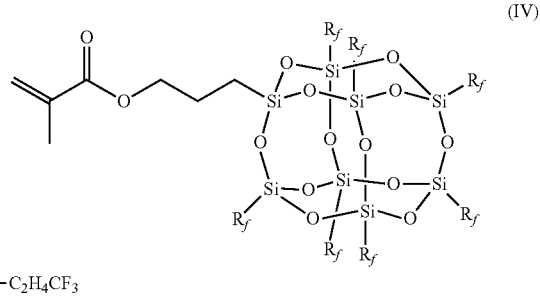

(IV)

$R_f$ —$C_2H_4CF_3$

Production Example 2: Preparation of Coating Agent A

The polymer A-1 (2.22 g), pentaerythritol triacrylate (57.46 g), 1,6-hexanediol diacrylate (3.19 g), a urethane acrylate oligomer having a carbamate acrylate functional group (6.02 g), α-hydroxyacetophenone (3.19 g), methyl isobutyl ketone (97.91 g), and ethyl acetate (56.67 g) are added to a stainless-steel flask of 0.5 L scale, and stirred for 1 hr with a stirring blade, to obtain a coating agent A having a solid content (active ingredient) of 30 wt %.

Production Example 3: Preparation of Coating Agent B

Opstar Z7535 (trade name; 100 g, solid content 40 wt %, manufactured by DIC Corporation), and methyl ethyl ketone (32 g) are added to a stainless-steel flask of 0.5 L scale, and stirred for 1 hr with a stirring blade, to obtain a coating B having a solid content of 30 wt %.

Production Example 4: Preparation of Coating Agent C

Defensa FH-800ME (trade name; 50 g, solid content 90 wt %, manufactured by DIC Corporation), and methyl ethyl ketone (100 g) are added to a stainless-steel flask of 0.5 L scale, and stirred for 1 hr with a stirring blade, to obtain a coating agent C having a solid content of 30 wt %.

Production Example 5: Preparation of Adhesive A 30 parts by weight of ethyl acetate is added to an acrylic adhesive A that is a copolymer containing 40-55 parts by weight of butyl acrylate, 40-55 parts by weight of methyl acrylate, 1-15 parts by weight of vinyl acetate and 0.1-3 parts by weight of a carboxyl-containing acrylic compound, and stirred at 23° C. for 30 min with a stirring blade. The solid content is adjusted to 23 wt %, and the viscosity is adjusted to 1000 CPS. The weight average molecular weight (Mw) of the adhesive A is 550,000, and the glass transition temperature is −16° C.

Production Example 6: Preparation of Adhesive B 30 parts by weight of ethyl acetate is added to an acrylic adhesive B that is a copolymer containing 60-95 parts by weight of butyl acrylate, 5-35 parts by weight of ethyl acrylate and 0.1-5 parts by weight of a carboxyl-containing acrylic compound, and stirred at 23° C. for 30 min with a stirring blade. The solid content is adjusted to 23 wt %, and the viscosity is adjusted to 1000 CPS. The weight average molecular weight (Mw) of the adhesive B is 550,000, and the glass transition temperature is −46° C.

Example 1: Preparation of Laminate 1

The adhesive A prepared is die coated onto a thermoplastic polyurethane film having a 50 μm protection film prepared with polyethylene terephthalate attached to a single surface thereof (trade name; Argotec 49510, manufactured by Argotec LLC, thickness 6 mil=152.4 μm), and dried for 3 min at 70° C., to form a 30 μm adhesive layer. Further, a 75 μm-thick polyethylene terephthalate film (peelable film A, surface roughness 716 nm) subjected to peel treatment with a silicone resin is pressed onto a surface of the adhesive layer by a rubber roller, and cured for 1 day at 45° C. Then, the 50 μm protection film prepared with polyethylene terephthalate is peeled off, and the coating agent A is applied onto the surface by a coating rod No. 6 (manufactured by R.D.S.Webster) and dried for 3 min at 90° C. Afterwards, the coating is photo cured by using a conveyor-type UV irradiation device having H-bulb manufactured by Fusion (cumulative light density: 850 mJ/cm$^2$), to obtain a laminate 1.

Comparative Example 1: Preparation of Laminate 2

The adhesive A prepared is die coated onto a thermoplastic polyurethane film having a 50 μm protection film prepared with polyethylene terephthalate attached to a single surface thereof (trade name; Argotec 49510, manufactured by Argotec LLC, thickness 6 mil), and dried for 3 min at 70° C., to form a 30 μm adhesive layer. Further, a 75 μm-thick polyethylene terephthalate film (peelable film A, surface roughness 716 nm) subjected to peel treatment with a silicone resin is pressed onto a surface of the adhesive layer by a rubber roller, and cured for 1 day at 45° C. Then, the 50 μm protection film prepared with polyethylene terephthalate is peeled off, and the coating agent B is applied onto the surface by a coating rod No. 6 (manufactured by R.D.S.Webster) and dried for 3 min at 90° C. Afterwards, the coating is photo cured by using a conveyor-type UV irradiation device having H-bulb manufactured by Fusion (cumulative light density: 850 mJ/cm$^2$), to obtain a laminate 2.

Comparative Example 2: Preparation of Laminate 3

The adhesive A prepared is die coated onto a thermoplastic polyurethane film having a 50 μm protection film prepared with polyethylene terephthalate attached to a single surface thereof (trade name; Argotec 49510, manufactured by Argotec LLC, thickness 6 mil), and dried for 3 min at 70° C., to form a 30 μm adhesive layer. Further, a 75 μm-thick polyethylene terephthalate film (peelable film A, surface roughness 716 nm) subjected to peel treatment with a silicone resin is pressed onto a surface of the adhesive layer by a rubber roller, and cured for 1 day at 45° C. Then, the 50 μm protection film prepared with polyethylene terephthalate is peeled off, and the coating agent C is applied onto the surface by a coating rod No. 6 (manufactured by R.D.S.Webster) and dried for 3 min at 90° C. Afterwards, the coating is photo cured by using a conveyor-type UV irradiation device having H-bulb manufactured by Fusion (cumulative light density: 850 mJ/cm$^2$), to obtain a laminate 3.

Example 2: Preparation of Laminate 4

The adhesive A prepared is die coated onto a thermoplastic polyurethane film having a 50 μm protection film prepared with polyethylene terephthalate attached to a single surface thereof (trade name; Argotec 49510, manufactured by Argotec LLC, thickness 6 mil=152.4 μm), and dried for 3 min at 70° C., to form a 30 μm adhesive layer. Further, a 75 μm-thick polyethylene terephthalate film (peelable film B, surface roughness 641 nm) subjected to peel treatment with a silicone resin is pressed onto a surface of the adhesive layer by a rubber roller, and cured for 1 day at 45° C., to obtain a laminate 4.

Comparative Example 3: Preparation of Laminate 5

The adhesive B prepared is die coated onto a thermoplastic polyurethane film having a 50 μm protection film prepared with polyethylene terephthalate attached to a single surface thereof (trade name; Argotec 49510, manufactured by Argotec LLC, thickness 6 mil=152.4 min), and dried for 3 min at 70° C., to form a 30 μm adhesive layer. Further, a 75 km-thick polyethylene terephthalate film (peelable film A, surface roughness 700 nm) subjected to peel treatment with a silicone resin is pressed onto a surface of the adhesive layer by a rubber roller, and cured for 1 day at 45° C., to obtain a laminate 5.

Comparative Example 4: Laminate 6

Scotchgard (trade name, manufactured by 3M Company) (laminate 6) is used as a comparative example.

Comparative Example 5: Laminate 7

NanoFusion Film (trade name, manufactured by CCL Industries) (laminate 7) is used as a comparative example.

[Test Method]
(1) Determination of Contact Angle
The contact angle between the surface layer of the laminate and water is determined by using a contact angle meter (Drop Master 400, manufactured by Kyowa Interface Science Co., Ltd.) using distilled water (for nitrogen and phosphorus measurement, manufactured by Kanto Chemical Co., Ltd.) as a probe liquid
(2) Evaluation of Antifouling Property
The repellency to oily ink is evaluated using a black oily marker (manufactured by Sharpie) by scribing on the surface layer of the laminate and the wiping property is evaluated by using Dusper K-3 (manufactured by Ozu Industrial Co., Ltd.).

(3) Elongation at Break

The peelable film of the laminate cut to have a size of 35 mm in width and 200 mm in length is peeled off and secured onto an upper and lower crosshead in a tensile tester (Strograph VG, manufactured by Toyo Seiki Seisaku-Sho, Ltd) with the distance between the clamps being 100 mm, and the crosshead is moved at a speed of 127 mm/min, to visually observe the moving distance at which the crack is produced on the surface. The elongation at break is calculated from the Equation (5) below:

Elongation at break (%)=Moving distance of crosshead (mm)/distance between the clamps (mm)×100   (5)

(4) Evaluation of Penetrability

The peelable film of the laminate cut into a square of 5×5 mm is peeled off, and a specimen for cross-sectional observation is fabricated by cryogenic cutting. The surface of the laminate is observed under a scanning electron microscope (SU-70, manufactured by Hitachi High-technologies Co., Ltd.), to evaluate the penetrability.

Integration with the substrate layer by penetration: no boundary is observed between the substrate layer and the curable resin layer (surface layer).

No penetration and separation of the substrate layer from the curable resin layer (surface layer): a boundary is observed between the substrate layer and the curable resin layer (surface layer).

(5) Adhesion Force

The peelable film of the laminate cut to have a size of 25 mm in width and 200 mm in length is peeled off, and the laminate is pressed onto a painted plate with black paint for automotive vehicles (width 50 mm, length 150 mm, and thickness 1.2 mm) by a 2 kg rubber roll moving to-and-fro at a speed of 5 mm/s. After standing for 30 min at 23° C.±2° C. and 50±5% RH, the adhesion force of the laminate attached to the painted plate is determined by a tensile tester (Strograph VG, manufactured by Toyo Seiki Seisaku-Sho, Ltd), where the load of the crosshead is 100N and the moving speed of the crosshead is 300 mm/min.

(6) Peeling Force

The peelable film of the laminate cut to have a size of 25 mm in width and 200 mm in length is peeled off at one end, the peelable film is secured to an upper crosshead of a tensile tester (Strograph VG, manufactured by Toyo Seiki Seisaku-Sho, Ltd), and the end of the laminate with the peelable film peeled off is secured to a lower crosshead. The peeling force between the adhesive layer and the peelable film is determined under a load of the crosshead of 100N at a moving speed of the crosshead of 300 mm/min.

(7) Surface Roughness

The peelable film is peeled off from the laminate, and the arithmetic mean roughness R(a) of the surface of the adhesive layer is measured using a three-dimensional optical interference roughness meter (Contour GT, manufactured by Bruker AXS).

(8) Adhesion Property

The peelable film of the laminate cut to have a size of 40 mm in width and 130 mm in length is peeled off, and an aqueous solution prepared by mixing 2 to 3 drops of baby bath lotion (baby body lotion, manufactured by Johnson & Johnson) in 1 L water is sprayed onto the surface side and surface of the adhesive layer and a painted plate with black paint for automotive vehicles (width 50 mm, length 150 mm, and thickness 1.2 mm). The surface of the adhesive layer of the laminate is attached to the painted plate, and the air and water bubbles is expelled out by using a rubber squeegee at the same time. Then, the obtained product is stood at room temperature, and the time during which the air and water bubbles remained between the surface of the adhesive layer and the painted plate are visually observed to disappear is determined.

(9) Heat Resistance

The peelable film of the laminate cut to have a size of 40 mm in width and 130 mm in length is peeled off, and an aqueous solution prepared by mixing 2 to 3 drops of baby bath lotion (baby body lotion, manufactured by Johnson & Johnson) in 1 L water is sprayed onto the surface side and surface of the adhesive layer and a painted plate with black paint for automotive vehicles (width 50 mm, length 150 mm, and thickness 1.2 mm). The surface of the adhesive layer of the laminate is attached to the painted plate, and the air and water bubbles is expelled out by using a rubber scraper at the same time. Then, the obtained product is stood for 1 day at room temperature, then heated for 24 hrs in an oven at 80° C., and stood for 1 hour or longer at room temperature. Subsequently, the laminate attached to the painted plate is peeled off, to visually observe the state of the painted plate. The conditions above are equivalent to one month of outdoor exposure in summer. It is further confirmed that the test result is also consistent with the actual test result of automotive vehicles.

(10) Weatherability

Accelerated weathering test: The accelerated weathering test is carried out by using a SW-type accelerated weathering tester specified in JIS B 7753, where a single surface of the laminate (150 mm in length and 50 mm in width) attached to a coated film is irradiated with a radiant flux density of 255 W/m$^2$±45 W/m$^2$ at a wavelength of 300 to 700 nm.

A sunshine super long-life weather meter (model WEL-SUN-HC-B) manufactured by Suga Test Instruments Co., Ltd is used.

Moreover, the test conditions of the accelerated weathering test are as follows.

Daylight carbon arc lamps: 4

Glass filter (Type A)

Power supply voltage: single-phase AC voltage at 180 V to 230 V

Irradiation Conditions

Average discharge voltage and current: 50 V (±2%), 60 A (±2%)

Temperature exhibited on black panel thermometer: 63±3° C.

Relative humidity: (50±5)%

Rainfall conditions: raining (using deionized water) periodically occurs for 12 minutes every 60 minutes.

Radiant flux density received on the surface of the test piece: 255±45 W/m$^2$ at 300 nm to 700 nm Irradiation time: 1000 hours (equivalent to one year of outdoor exposure.

Further, it is confirmed that the test result is consistent with the actual test result of automotive vehicles)

TABLE 2

Figure 3:
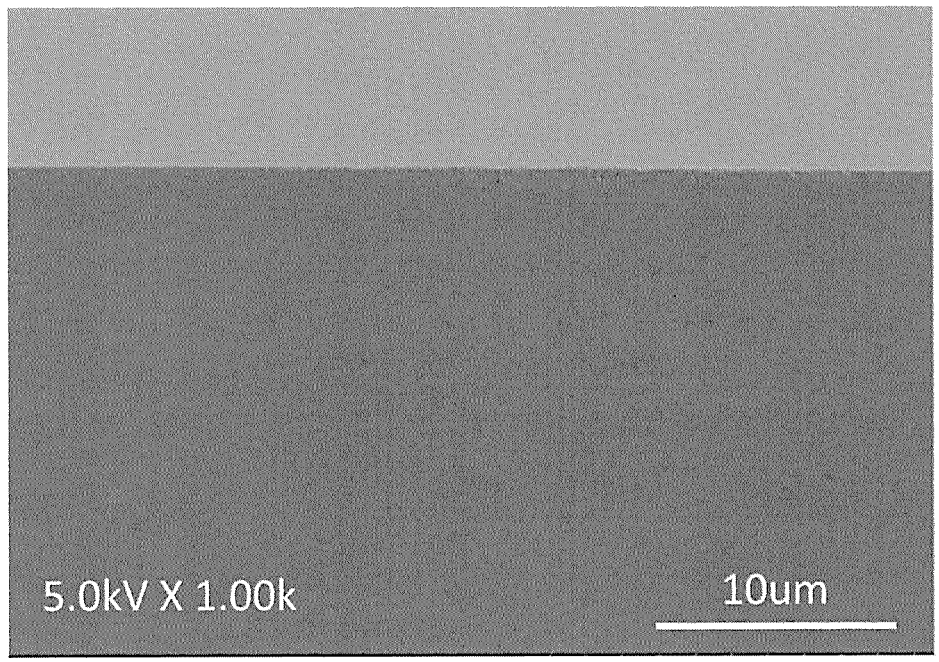
FIG. 3 is a scanning electron microscope (SEM) image at a cross section of Embodiment 1 (laminate 1).
Figure 4:
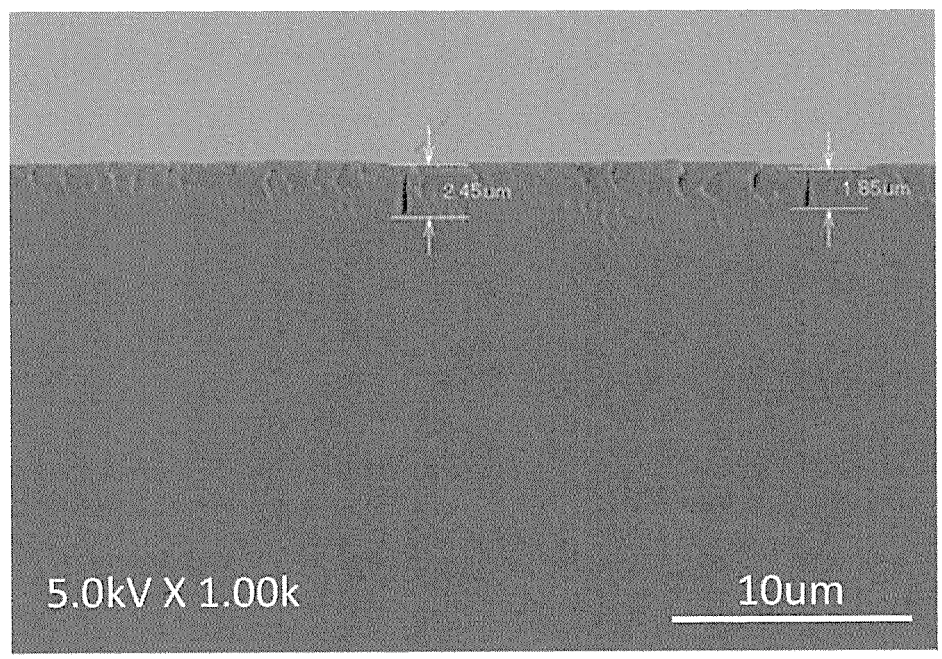
FIG. 4 is an SEM image at a cross section of Comparative Embodiment 1 (laminate 1) (laminate 2).
Figure 5:
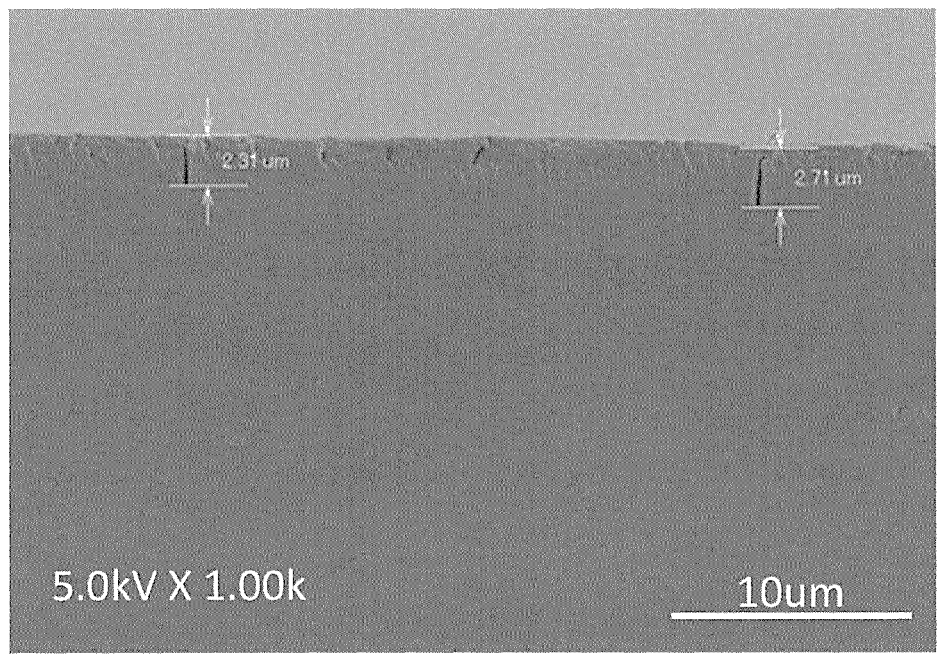
FIG. 5 is an SEM image at a cross section of Comparative Embodiment 2 (laminate 1) (laminate 3).

|  |  | Example 1 | Comparative Example 1 | Comparative Example 2 |
|---|---|---|---|---|
| Layer | Laminate | Laminate 1 | Laminate 2 | Laminate 3 |
|  | Substrate | Argotec 49510 | Argotec 49510 | Argotec 49510 |
|  | Coating agent | Coating agent A | Coating agent B | Coating agent C |
|  | Adhesive | Adhesive A | Adhesive A | Adhesive A |
|  | Peelable film | Peelable film A | Peelable film A | Peelable film A |
| Property evaluation | Contact angle with water (°) | 102 | 101 | 102 |
|  | Antifouling property (marking ink test) | repellent, and completely wiped off | repellent, and completely wiped off | repellent, and completely wiped off |
|  | Elongation at break (%) | 80-120 | <5 | <5 |
|  | Penetrability | Integrated with substrate layer SEM image FIG. 3 | Separated from substrate layer SEM image FIG. 4 | Separated from substrate layer SEM image FIG. 5 |

Figure 2:
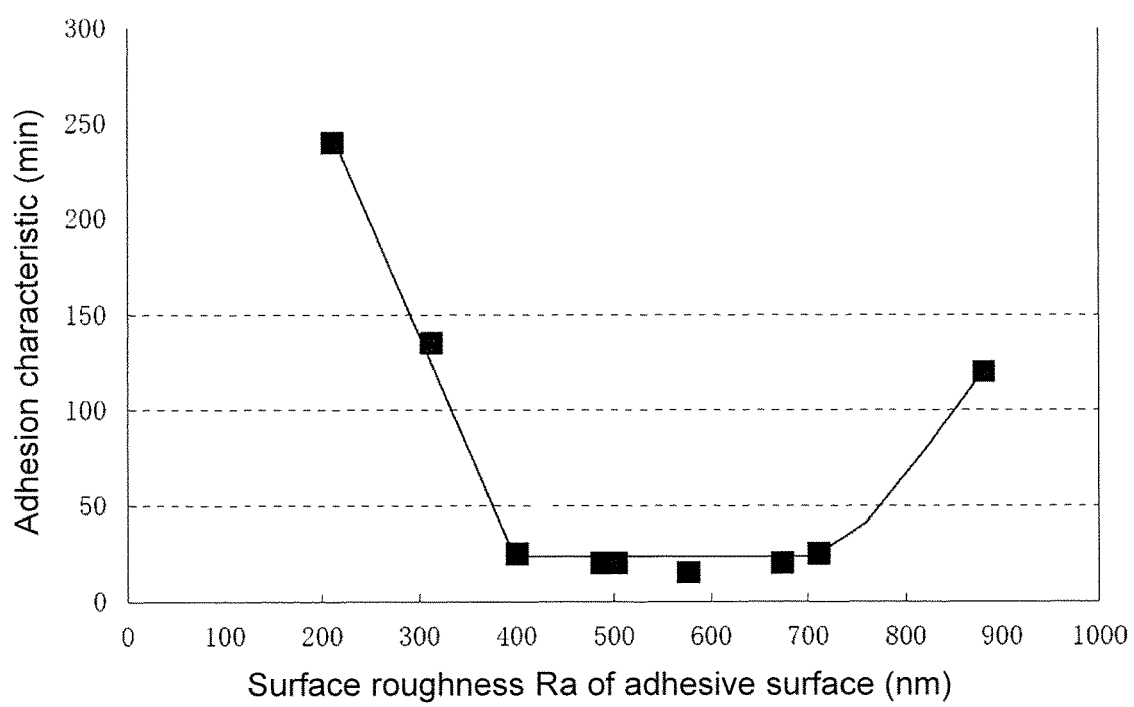
FIG. 2 is a graph showing the relation between the surface roughness (Ra) and adhesion property of an adhesive surface.

As is known from Table 2, when compared with Comparative Examples 1 and 2, it is apparent that Example 1 has water repellency, antifouling property, and high elongation at break. The reason underlying this is that the coating agent A of Example 1 permeates into the substrate and integrated with the substrate layer. This can be known from the fact that no boundary is observed between the substrate layer and the curable resin layer (surface layer) in the SEM images of the cross sections of the laminate (FIGS. 3 to 5).

in Table 3 and FIG. 2, a high adhesion property is exhibited when the surface roughness of the adhesive surface is in the range of 350 to 750 nm.

Further, as shown in Table 2, the heat resistance and the weatherability of the adhesive layers of Examples 1 and 2 are higher, compared with Comparative Examples 3 to 5. After test, the laminate can be easily peeled off from the adhered articles with no paste residue remaining. In contrast, paste residue is observed for the adhesive layers of Comparative Examples 3 to 5 after test.

TABLE 3

|  |  | Example 1 | Example 2 | Comparative Example 3 | Comparative Example 4 | Comparative Example 5 |
|---|---|---|---|---|---|---|
| Layer | Laminate | Laminate 1 | Laminate 4 | Laminate 5 | Laminate 6 | Laminate 7 |
|  | Substrate | Argotec 49510 | Argotec 49510 | Argotec 49510 | Scotchgard (manufactured by 3M Company) | NanoFusion Film (manufactured by CCL Industries) |
|  | Coating agent | Coating agent A | — | — |  |  |
|  | Adhesive | Adhesive A | Adhesive A | Adhesive B |  |  |
|  | Peelable film | Peelable film A | Peelable films B | Peelable film A |  |  |
| Property evaluation | Adhesion property (min) | 20 | 20 | 20 | 135 | 240 |
|  | Surface roughness of adhesive layer (nm) | 673 | 502 | 576 | 313 | 211 |
|  | Adhesion force (N/25 mm) | 22.3 | 23.0 | 16.0 | 32.3 | 24.5 |
|  | Peeling force (N/25 mm) | 1.1 | 0.5 | 0.8 | 0.1 | 0.1 |
|  | Heat resistance | No adhesive residue | No adhesive residue | Adhesive residue present | Adhesive residue present | Adhesive residue present |
|  | Weatherability | No adhesive residue | No adhesive residue | Adhesive residue present | Adhesive residue present | Adhesive residue present |

Example 2 and Comparative Example 3 are a laminate in which the coating agent A is not used. In Example 2, a peelable film B having a surface roughness different from that of the peelable film A used in Example 1 is used, to form the irregularities on the adhesive layer. In Comparative Example 3, an adhesive B different from the adhesive A used in Example 1 is used to form the adhesive layer. As shown Evaluation results for glue residue resulting from the adhesive layer are shown below.

Example 1

A polyurethane film having a thickness of 150 μm is used as a substrate film, and a polyethylene terephthalate film having a thickness of 75 μm and coated with a silicone resin is used as a peelable film. As for the adhesive layer, the adhesive layer A is fabricated by blade coating in such a manner that the coated amount after drying is 30 μm (a copolymer obtainable by copolymerizing butyl acrylate as a main monomer with a carboxyl group-containing monomer such as methyl acrylate and vinyl acetate, and having a weight-average molecular weight (Mw) of 150,000 to 1,000,000).

Comparative Example 6

A polyurethane film having a thickness of 150 μm is used as a substrate film, and a polyethylene terephthalate film having a thickness of 75 μm and coated with a silicone resin is used as a peelable film. As for the adhesive layer, the adhesive layer B is fabricated by blade coating in such a manner that the coated amount after drying is 30 μm (a copolymer obtainable by copolymerizing butyl acrylate as a main monomer with methyl methacrylate, and having a weight-average molecular weight (Mw) of 150,000 to 1,000,000).

[Evaluation Item and Evaluation Method]

A two-component polyurethane exterior coating for automotive vehicles was sprayed onto a plate of a polyolefin-based thermoplastic elastomer coated with an electroplating primer and a middle coating at a thickness of about 1 μm, dried for 10 minutes at 60° C. and stood at room temperature for 30 minutes. Then, the adhesive layers prepared in Example 1 and Comparative Example 6 are attached to the coated film. The adhesive layers attached to the coating surface are stood in a thermostat bath at 80° C. for 168 hours and then at room temperature for 1 hour or more, to visually and microscopically observe the surface condition of the coated film upon peeling. The evaluation criteria include the following.

(1) Glue Residue
○: No glue residue on the coating surface
Δ: Few glue residue present on the coating surface
x: Glue residue present on the coating surface

TABLE 4

|  | Example 1 | Comparative Example 6 |
| --- | --- | --- |
| Glue residue | ○ | x |

All of the above documents including the publications, patents and patent applications are herein incorporated by reference in their entirety to the same extent as if the disclosure of each individual publication, patent application or patent is specifically and individually indicated to be incorporated by reference in its entirety.

It should be understood that unless specifically indicated otherwise or where no obvious contradiction to the context exists, the nouns and the same expressions used in connection with the description of the present invention (particularly in connection with the following claims) comprise both the singular and plural referents. The words "possess", "have", "contain" and "include" shall be construed as open end terms (i.e., having the meaning of "encompassing without limitation") unless otherwise specified. Unless otherwise specified in the present specification, specific descriptions of the numerical ranges in the present specification are merely an notation of reference to each individual values in the range, and each value inclusive is incorporated herein as if the value is specifically and individually indicated to be incorporated. Unless specifically indicated otherwise or where no obvious contradiction to the context exists, all the methods described in this specification may be carried out in any suitable order. All the examples or illustrative languages (e.g. "and the like") used in this specification are merely provided for illustrating the present invention fully, instead of limiting the protection scope of the present invention, unless specifically stated otherwise. All the expressions in the specification are not to be construed as being essential to the practice of the present invention, but refer to the elements not described in the claims.

In this specification, preferred embodiments of the present invention, including those known to the inventors, are described for the purpose of practicing the present invention. Variations of the preferred embodiments are apparent to those skilled in the art upon reading the description. The present inventors anticipate that the skilled person can appropriately apply such a variation, and the present invention can be implemented by a method other than that specifically described in the present specification. Accordingly, the present invention embraces, as permitted by the standards law, all the changes and equivalents of the contents described in the appended claims. Furthermore, any combination of the elements in all the variations is encompassed by the present invention, unless specifically indicated otherwise, or where no obvious contradiction to the context exists.

What is claimed is:

1. A laminate, comprising:
a substrate film, formed from thermoplastic polyurethane; and
an adhesive layer, formed on a first surface side of the substrate film, wherein
the substrate film has a surface layer on the opposite side of the first surface side, a mixture of the thermoplastic polyurethane and a curable resin composition being present in the surface layer,
the curable resin composition contains at least one fluorine compound selected from the group consisting of fluorosilsesquioxane and fluorosilsesquioxane polymers, and a curable resin,
the curable resin composition penetrates into an interior of the substrate film such that the surface layer integrates with a part of the substrate film, and
the adhesive layer has a surface roughness of 350-750 nm.

2. The laminate according to claim 1, wherein the fluorine compound has a cage structure,
the curable resin comprising at least a compound having a (meth)acryloyl group, and
the adhesive layer is formed with at least a resin selected from a group consisting of acrylic resin, urethane resin, rubber resin, and silicone resin.

3. The laminate according to claim 1, wherein the fluorosilsesquioxane polymer is an addition polymer of fluorosilsesquioxane having at least one addition polymerizable functional group, or an addition copolymer of fluorosilsesquioxane having one addition polymerizable functional group with an addition polymerizable monomer.

4. The laminate according to claim 1, comprising a peelable film provided on a surface of the adhesive layer opposing the substrate film, wherein
a surface of the peelable film facing toward the adhesive layer has a surface roughness of 350-800 nm.

5. The laminate according to claim 4, wherein the adhesive layer retains irregularities exhibiting the surface roughness in a period from 10 to 120 min after the peelable film is peeled off.

6. The laminate according to claim 4, wherein the surface of the peelable film facing toward the adhesive layer is coated with at least a peeling agent selected from fluorine resins and silicone resins.

7. A surface protected article, comprising:
a laminate according to claim 1; and
an article where the laminate is attached to a surface thereof by the adhesive layer, wherein
irregularities of the adhesive layer exhibiting the surface roughness have disappeared.

8. The laminate according to claim 2, wherein the fluorosilsesquioxane polymer is an addition polymer of fluorosilsesquioxane having at least one addition polymerizable functional group, or an addition copolymer of fluorosilsesquioxane having one addition polymerizable functional group with an addition polymerizable monomer.

9. The laminate according to claim 2, comprising a peelable film provided on a surface of the adhesive layer opposing the substrate film, wherein
a surface of the peelable film facing toward the adhesive layer has a surface roughness of 350-800 nm.

10. The laminate according to claim 9, wherein the adhesive layer retains irregularities exhibiting the surface roughness in a period from 10 to 120 min after the peelable film is peeled off.

11. The laminate according to claim 9, wherein the surface of the peelable film facing toward the adhesive layer is coated with at least a peeling agent selected from fluorine resins, and silicone resins.

12. The laminate according to claim 10, wherein the surface of the peelable film facing toward the adhesive layer is coated with at least a peeling agent selected from fluorine resins, and silicone resins.

13. A surface protected article, comprising:
a laminate according to claim 2; and
an article where the laminate is attached to a surface thereof by the adhesive layer, wherein
irregularities of the adhesive layer exhibiting the surface roughness have disappeared.

14. A surface protected article, comprising:
a laminate according to claim 3; and
an article where the laminate is attached to a surface thereof by the adhesive layer, wherein
irregularities of the adhesive layer exhibiting the surface roughness have disappeared.

15. A surface protected article, comprising:
a laminate according to claim 8; and
an article where the laminate is attached to a surface thereof by the adhesive layer, wherein
irregularities of the adhesive layer exhibiting the surface roughness have disappeared.

* * * * *